United States Patent [19]
Vegesna et al.

[11] Patent Number: 5,640,588
[45] Date of Patent: Jun. 17, 1997

[54] CPU ARCHITECTURE PERFORMING DYNAMIC INSTRUCTION SCHEDULING AT TIME OF EXECUTION WITHIN SINGLE CLOCK CYCLE

[75] Inventors: Anantakotiraju Vegesna; Jayachandra B. Avula; Peter H. Jewett; Yatin G. Mundkur; Vinay J. Naik; James E. Monaco, all of Austin, Tex.

[73] Assignee: Ross Technology, Inc., Austin, Tex.

[21] Appl. No.: 592,989

[22] Filed: Jan. 29, 1996

Related U.S. Application Data

[63] Continuation of Ser. No. 208,091, Mar. 7, 1994, Pat. No. 5,488,729, which is a continuation of Ser. No. 701,142, May 15, 1991, abandoned.

[51] Int. Cl.$^6$ ............................................. G06F 9/38
[52] U.S. Cl. .................. 395/800; 395/390; 395/392; 364/230.3; 364/231.8; 364/262.4; 364/DIG. 1
[58] Field of Search .................................. 395/800, 375, 395/550, 650; 364/131–134

[56] References Cited

U.S. PATENT DOCUMENTS

| | | | |
|---|---|---|---|
| 4,760,519 | 7/1988 | Papworth et al. | 395/375 |
| 5,006,980 | 4/1991 | Sanders et al. | 395/375 |
| 5,073,855 | 12/1991 | Staplin et al. | 395/375 |
| 5,261,063 | 11/1993 | Kohn et al. | 395/375 |
| 5,428,810 | 6/1995 | Barkans et al. | 395/800 |
| 5,487,156 | 1/1996 | Popescu et al. | 395/375 |

*Primary Examiner*—Alpesh M. Shah
*Attorney, Agent, or Firm*—Irell & Manella LLP

[57] ABSTRACT

An apparatus and method for scheduling a sequence of instructions for achieving multiple launches and multiple executions of the instructions within a central processing unit. Each of the instructions is classified according to which one of multiple execution resources of the central processing unit executes the instruction. The classifications include memory reference operations, integer operations, program control operations, and floating point arithmetic operations. The classifications associated with the instructions occur in the order in which the instructions occur in the sequence.

8 Claims, 23 Drawing Sheets

| INSTRUCTION NUMBER | CLOCK CYCLE NUMBER | | | | | | | | |
|---|---|---|---|---|---|---|---|---|---|
| | 1 | 2 | 3 | 4 | 5 | 6 | 7 | 8 | 9 |
| i | F | D | E | C | W | | | | |
| i+1 | | F | D | E | C | W | | | |
| i+2 | | | F | D | E | C | W | | |
| i+3 | | | | F | D | E | C | W | |
| i+4 | | | | | F | D | E | C | W |

| INSTRUCTION NUMBER | CLOCK CYCLE NUMBER | | | | | | | | |
|---|---|---|---|---|---|---|---|---|---|
| | 1 | 2 | 3 | 4 | 5 | 6 | 7 | 8 | 9 |
| LOAD INSTRUCTION | F | D | E | C | W | | | | |
| i+1 | | F | D | E | C | W | | | |
| i+2 | | | F | D | E | C | W | | |
| i+3 | | | | stall | F | D | E | C | W |
| i+4 | | | | | | F | D | E | C |

| INSTRUCTION NUMBER | CLOCK CYCLE NUMBER | | | | | | | | |
|---|---|---|---|---|---|---|---|---|---|
| | 1 | 2 | 3 | 4 | 5 | 6 | 7 | 8 | 9 |
| ADD INSTRUCTION | F | D | E | C | W | | | | |
| ld INSTRUCTION | | F | D | E | C | W | | | |

DATA READ HERE — DATA WRITTEN HERE

| INSTRUCTION NUMBER | CLOCK CYCLE NUMBER | | | | | | | | | |
|---|---|---|---|---|---|---|---|---|---|---|
| | 1 | 2 | 3 | 4 | 5 | 6 | 7 | 8 | 9 | 10 |
| ANY INSTRUCTION | F | D | E | C | W | | | | | |
| ld (%r2+%r3),r1 | | F | D | E | C | W | | | | |
| ADD %r1,%r4,%r5 | | | F | D | stall | E | C | W | | |
| SUB %r8,%r9,%r10 | | | | F | stall | D | E | C | W | |
| OR %r10,%r11,%r12 | | | | | stall | F | D | E | C | W |

FIG. 8

| INSTRUCTION NUMBER | CLOCK CYCLE NUMBER | | | | | | | | | |
|---|---|---|---|---|---|---|---|---|---|---|
| | 1 | 2 | 3 | 4 | 5 | 6 | 7 | 8 | 9 | 10 |
| BRANCH INSTRUCTION | F | D | E | C | W | | | | | |
| i+1 | | STALL | STALL | STALL | F | D | E | C | W | |
| i+2 | | | STALL | STALL | STALL | F | D | E | C | W |

FIG. 9

| INSTRUCTION NUMBER | CLOCK CYCLE NUMBER | | | | | | | | | |
|---|---|---|---|---|---|---|---|---|---|---|
| | 1 | 2 | 3 | 4 | 5 | 6 | 7 | 8 | 9 | 10 |
| BRANCH INSTRUCTION | F | D | E | C | W | | | | | |
| i+1 | | F | STALL | STALL | STALL | D | E | C | W | |
| i+2 | | | F | STALL | STALL | STALL | D | E | W | C |

| INSTRUCTION | CLOCK CYCLE NUMBER | | | | | | | | | |
|---|---|---|---|---|---|---|---|---|---|---|
| | 1 | 2 | 3 | 4 | 5 | 6 | 7 | 8 | 9 | 10 |
| UNTAKEN BRANCH i | F | D | E | C | W | | | | | |
| i+1 | | F | D | E | C | W | | | | |
| i+2 | | | F | D | E | C | W | | | |
| i+3 | | | | F | D | E | C | W | | |

| INSTRUCTION | CLOCK CYCLE NUMBER | | | | | | | | | |
|---|---|---|---|---|---|---|---|---|---|---|
| | 1 | 2 | 3 | 4 | 5 | 6 | 7 | 8 | 9 | 10 |
| TAKEN BRANCH i | F | D | E | C | W | | | | | |
| TARGET | | F | F | D | E | C | W | | | |
| TARGET+1 | | | stall | F | D | E | C | W | | |
| TARGET+2 | | | | stall | F | D | E | C | W | |

FIG. 10

| PIPELINE STAGE | PROBLEM INTERRUPTS |
|---|---|
| F | PAGE FAULT ON INSTRUCTION FETCH; MISALIGNED MEMORY ACCESS; MEMORY PROTECTION VIOLATION |
| D | UNDEFINED OR ILLEGAL (i.e. UNIMPLEMENTED) OP CODE |
| E | ARITHMETIC INTERRUPT (i.e. OVERFLOW) |
| C | PAGE FAULT ON DATA FETCH; MISALIGNED MEMORY ACCESS; MEMORY PROTECTION VIOLATION |
| W | NONE |

| INSTRUCTION NUMBER | CLOCK CYCLE NUMBER ||||||||
|---|---|---|---|---|---|---|---|---|
| | 1 | 2 | 3 | 4 | 5 | 6 | 7 | 8 |
| iA | F | D | E | C | W | | | |
| iB | F | D | E | C | W | | | |
| iA+1 | | F | D | E | C | W | | |
| iB+1 | | F | D | E | C | W | | |
| iA+2 | | | F | D | E | C | W | |
| iB+2 | | | F | D | E | C | W | |
| iA+3 | | | | F | D | E | C | W |
| iB+3 | | | | F | D | E | C | W |

| INSTRUCTION NUMBER | CLOCK CYCLE NUMBER | | | | | | | |
|---|---|---|---|---|---|---|---|---|
| | 1 | 2 | 3 | 4 | 5 | 6 | 7 | 8 |
| INTEGER i | F | D | E | C | W | | | |
| FLOATING-POINT i | F | D | E | C | W | | | |
| INTEGER i+1 | | F | D | E | C | W | | |
| FLOATING-POINT i+1 | | F | D | E | C | W | | |
| INTEGER i+2 | | | F | D | E | C | W | |
| FLOATING-POINT i+2 | | | F | D | E | C | W | |
| INTEGER i+3 | | | | F | D | E | C | W |
| FLOATING-POINT i+3 | | | | F | D | E | C | W |

FIG. 16

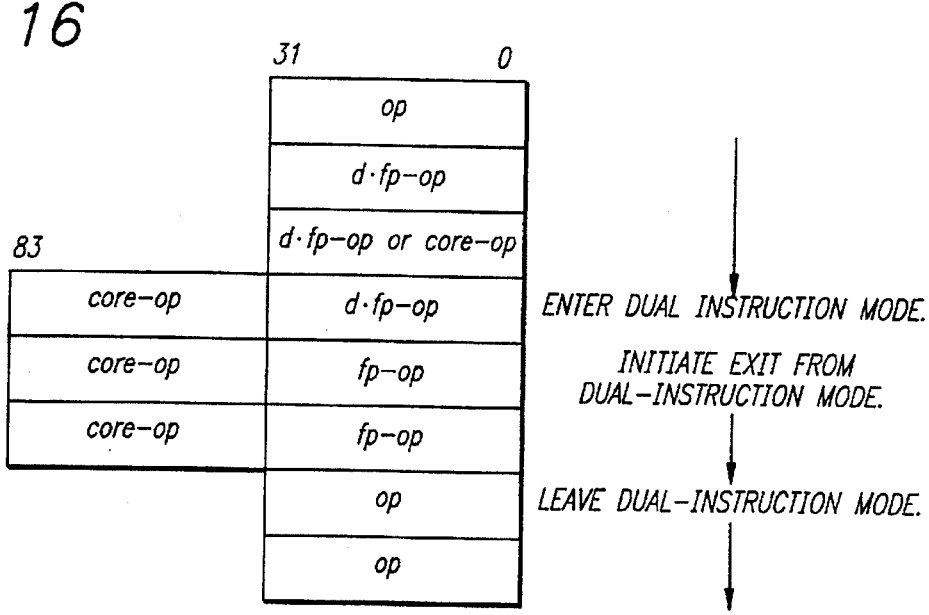

FIG. 17

| MACHINE-TYPE SEQUENCE | DESCRIPTION |
|---|---|
| R M x x | REG-SIDE FOLLOWED IMMEDIATELY BY A MEM-SIDE INSTRUCTION |
| R M C x | REG-SIDE FOLLOWED IMMEDIATELY BY A MEM-SIDE FOLLOWED IMMEDIATELY BY A CTRL INSTRUCTION |
| R M x C | REG-SIDE FOLLOWED IMMEDIATELY BY A MEM-SIDE FOLLOWED BY A CTRL INSTRUCTION IN THE SAME ROLLING QUAD-WORD |
| R C x x | REG-SIDE FOLLOWED IMMEDIATELY BY A CTRL INSTRUCTION |
| R x C x | REG-SIDE FOLLOWED BY A CTRL INSTRUCTION IN THE SAME ROLLING QUAD-WORD |
| R x x C | REG-SIDE FOLLOWED BY A CTRL INSTRUCTION IN THE SAME ROLLING QUAD-WORD |
| M C x x | MEM-SIDE FOLLOWED IMMEDIATELY BY A CTRL INSTRUCTION |
| M x C x | MEM-SIDE FOLLOWED BY A CTRL INSTRUCTION IN THE SAME ROLLING QUAD-WORD |
| M x x C | MEM-SIDE FOLLOWED BY A CTRL INSTRUCTION IN THE SAME ROLLING QUAD-WORD |

FIG. 25

CALL:

| (OP1) | |
|---|---|
| 31  29 | 0 |

SETHI AND BRANCH:

| (OP1) | A | CC | (OP2) | CONST22 |
|---|---|---|---|---|
| 31  29 | 28 | 24 | 21 | 0 |

IU REG-REG:

| (OP1) | RD | OP3 | RS1 | 0 | AS1 | RS2 |
|---|---|---|---|---|---|---|
| 31  29 | 24 | 18 | 13 | 12 | 5 | 0 |

IU REG-IMM:

| (OP1) | RD | OP3 | RS1 | 1 | SIMM3 |
|---|---|---|---|---|---|
| 31  29 | 24 | 18 | 13 | 12 | 0 |

FLOATING-POINT:

| (OP1) | RD | OP3 | RS1 | 0 | OPF | RS2 |
|---|---|---|---|---|---|---|
| 31  29 | 24 | 18 | 13 | 17 | 5 | 0 |

FIG. 26

PCU – (8 BITS)

| OPCODE1 | INSTRUCTION |
|---|---|
| 00 | bicc/fbfcc/cbccc |
| 01 | call |

| OP1 | OP2/OP3 |
|---|---|
| 31  30 | 24  19 |

ALU – (8 BITS)

| OP2/OP3 |
|---|
| 24  19 |

LDST – (8 BITS)

| OP2/OP3 |
|---|
| 24  19 |

FIG. 28

PACKET ONE :
    sethi % hi (CONST), % rx
    add % rx, % lo (CONST), % ry

PACKET TWO :
    sethi % hi (CONST), % rx
    OR % rx, % lo (CONST), % ry

FIG. 29

PACKET ONE :
    sethi % hi (CONST), % rx
    ld [% rx + imm], % rz

PACKET TWO :
    sethi % hi (CONST), % rx
    st % rz, [% rx + % ry]

PACKET THREE :
    sethi % hi (CONST), % rx
    ldstub [% rx + imm], % rz

PACKET FOUR :
    sethi % hi (CONST), % rx
    SWAP [% rx + % ry], % rz

FIG. 30

PACKET ONE :         add %r0, %r1, %r2
                     ld [%r2 + %r3], %r4                 ⎤ CASE I DEPENDENCIES PACKET TWO :         ldd [%r0 + %r1], %r2
                     sub %r0, %r3 %r%4

PACKET THREE :       ld [%r0 + %r1], %f3
                     fadd1 %f1, %f2, %f4

PACKET FOUR :        ldd [%r0 + %r1], %f0
                     fmuls %f1, %f2, %f4                 ⎦

PACKET FIVE :        fadds %f2, %f3, %f0
                     st %f0, [%r2 + %r3]                 ⎤ CASE II DEPENDENCIES PACKET SIX :         fadds %f2, %f3, %f1
                     std %f0, [%r2 + %r3]                ⎦

PACKET SEVEN :       ldd [%r5 + %r0], %r2
                     add %r0, %r1 %r3                    ⎤ CASE III DEPENDENCIES PACKET EIGHT :       faddd %f0, %f4, %f2
                     ld [%r5+ %r6], %f3                  ⎦

PACKET NINE :        fadds %f0, %f1, %f20
                     ldd [%r0+ %r1], %f0                 ⎤ CASE IV DEPENDENCY

FIG. 32

| SUB-GROUP-ID | SUB-GROUP-NAME |
|---|---|
| A | ldsb, ldsh, ld, ldub, lduh, ldd<br>ldf, lddf<br>st, stb, sth, std<br>stf, stdf<br>swap, ldstub |
| B | add, and, or, xor, sub, andn, orn, xnor<br>addx, subx<br>addcc, andcc, orcc, xorcc,<br>subcc, andncc, orncc, xorncc<br>adxcc, subxcc<br>taddcc, tsubcc,<br>mulscc<br>sll, srl, sra, scthi |
| C | fadds, faddd, fsubs, fsubd<br>fto (fp data convertsions)<br>fcmps, fcmpd, fcmpcs, fcmpcd<br>fmuls, fsmuld, fmuld<br>fdivs, fdivd, fsqrts, fsqrtd<br>fmovs, fnegs, fabes<br>fp instruction (quad precision) |
| D | (reserved) |
| E | bicc, fbfcc |
| F | call<br>jmpl, rett<br>save, restore<br>taddcctv, tsubcctv<br>umul, umulcc, smul, smulcc<br>rdy, rdpsr, rdwim, rdtbr<br>wry, wrpsr, wrwim, wrtbr<br>ldsba, ldsha, lda, lduba, lduha, ldda,<br>ldfsr<br>sta, stba, stha, stda, stdfq, stfsr,<br>swapa, ldstuba<br>trap, flush, cpops, cbccc, illegal,<br>ldc, lddc, ldcsr, stc, stdc, stcsr, stdcq |

CPU ARCHITECTURE PERFORMING DYNAMIC INSTRUCTION SCHEDULING AT TIME OF EXECUTION WITHIN SINGLE CLOCK CYCLE

This is a continuation of application Ser. No. 08/208,091, filed Mar. 7, 1994, which will issue as U.S. Pat. No. 5,488,729 on Jan. 30, 1996, which is a continuation of Ser. No. 07/701,142, filed May 15, 1991, now abandoned.

FIELD OF INVENTION

The present invention relates to an apparatus and method for enhancing the throughput performance of a central processing unit (CPU) of a computer system through the dynamic detection and exploitation of instruction-level parallelism inherent in computer program code, thus permitting the simultaneous issue and execution of multiple instructions and thereby decreasing the number of clock cycles per executed instruction to less than one. The technique employed permits the simultaneous issue of parallel instructions independent of the resource used to execute them, and is called symmetric instruction scheduling.

BACKGROUND OF THE INVENTION

The central processing unit ("CPU") of a computer system fetches program instructions and data from the system's memory, performs the logical and mathematical operations on that data as specified by the instructions, and stores the results of those operations back into the system's memory. The sequence in which the CPU performs these tasks is also dictated by the program instructions. An excellent reference to this background section is found in Chapter 6 of Hennessy and Patterson, Computer Architecture—A Quantitative Approach (1990).

The performance of a particular CPU is measured by the time it requires to execute a particular task or program. The CPU time to execute a program can be expressed as: CPU time=(instructions per program)*(clock cycles per instruction)*(clock period). Thus, CPU performance is dependent on each of these characteristics of CPU design. These characteristics are governed by interdependent design factors and therefore cannot be affected in isolation from one another. For example, the CPU of a reduced instruction set computer (RISC) is organized in a manner which greatly simplifies the instruction set that the CPU is capable of processing. This streamlined hardware organization and the accompanying simplified instruction set architecture decreases the clock period and the clock cycles per instruction (CPI). Because the instruction set is limited, however, the number of instructions required to execute the given task necessarily increases commensurately with the task's complexity.

The most widely accepted technique for increasing CPU throughput is called pipelining. Pipelining increases CPU performance predominantly through the reduction of CPI, although it can also reduce the CPU clock period to a lesser extent. Pipelining is a technique whereby instruction execution is broken down into a series of steps. Each step in the pipeline, known as a pipestage, completes a designated portion of an instruction's complete execution. Each pipestage adds to the execution in the same way that the station of an assembly line adds to the complete manufacture of a product. The instruction leaves the pipeline's final pipestage completely executed, just as a product leaves the assembly line completely assembled.

Ideally, a number of instructions equal to the number of pipestages comprising the pipeline may be overlapped in execution, each instruction occupying a different pipestage. If the CPU has sufficient resources, and earlier pipestages do not depend upon the completed results of later pipestages, each pipestage can independently perform its function (on the instruction currently occupying it) in parallel with the other pipestages. Further, if the average time a CPU requires to completely execute an instruction is divided equally between the pipestages, the speedup in CPU throughput for pipelined execution over sequential execution will be equal to the number of pipelined stages. Thus for an ideal pipeline comprised of five pipestages, five instructions will be executed in the average time required to execute one instruction sequentially; the speedup in throughput is five times. Notice that the pipeline does not decrease the average time to execute a single instruction, but rather decreases overall average execution time by completing more instructions per unit of time.

Assuming in the above example that the CPU clock cycles at the same rate with which the instructions move from one pipestage to the next, sequential execution yields a CPI of five whereas the ideal pipeline yields a CPI of one. There are physical limitations on what appears at first blush to be an unlimited ability to increase throughput by increasing the number of stages in a pipeline. First, splitting the execution of an instruction into stages of equal time duration is nearly impossible. The time for each pipestage will therefore be necessarily constrained to that of the slowest pipestage; instructions are advanced through the pipeline at a constant rate and each pipestage must be complete before it can pass its results to the next pipestage. Further, there is an overhead associated with the implementation and control of the pipeline; the results of each pipestage must be clocked into latches, creating delays which add to the time required to complete each pipestage. Finally there are practical limitations to the depth of any pipeline because the average time required to execute a single instruction remains relatively fixed.

SUMMARY OF THE INVENTION

The motivation to improve CPU performance by decreasing the number of clock cycles necessary to execute an instruction has created the need for single-chip CPU's capable of issuing multiple instructions per clock cycle. Early attempts to create architectures capable of such performance have been only marginally successful. The contexts in which current implementations are able to achieve multiple instruction issue per clock cycle are narrowly constrained and highly visible to the programmer; instructions must be written or compiled to take advantage of the limited opportunities for multiple instruction issue.

The preferred embodiment of the invention exceeds the performance of prior art implementations in a number of ways. First, the preferred embodiment is capable of issuing two core unit instructions (i.e. integer arithmetic and logical operations, memory access operations and program control operations) simultaneously, independent of the combination of instruction classes and the order in which those classes appear in the combination. Further, the preferred embodiment is capable of issuing a core unit instruction of any class concurrently with a floating-point instruction, independent of the order in which those instructions are grouped. The only constraint is that sufficient resources are available with which to execute the instructions at the moment prior to their simultaneous issuance.

If insufficient resources exist to execute two core unit instructions simultaneously (i.e. they both require the same resource), only the first of the paired instructions will issue. If insufficient resources exist to execute the floating-point instruction simultaneously with its paired core instruction (i.e. the Floating-point Unit is busy), the floating-point instruction is dispatched to the floating-point data path simultaneously with the launching of the core instruction. The floating-point instruction is queued in the floating-point data path and is issued when feasible under control of the floating-point data path. Thus, up to three instructions (i.e. two core instructions and one floating-point instruction) can issue simultaneously.

Briefly, the preferred embodiment of the invention includes a processor for executing instructions. The processor has the capability of scheduling a sequence of instructions for achieving multiple launches and executions of the instructions. Each of the instructions is classified according to which one of multiple execution resources of the processor executes the instruction. Classifications include memory reference operations, integer operations, program control operations and floating point arithmetic operations. The classifications associated with the instructions occur in the order in which the instructions in the instruction sequence occur. The processor contains the following three components. First, circuitry for evaluating the classification of each instruction of the instruction sequence to determine whether the multiple execution resources within the processor are available for enabling multiple launches and executions of the instructions to occur. Second, circuitry for utilizing the instruction classifications for simultaneously determining which of the multiple execution resources of the processor will execute each of the instructions and for detecting any data dependencies between the instructions of the sequence. Lastly, circuitry for utilizing the execution resource determination and the data dependency detection for launching and executing multiple instructions of the instruction sequence independent of the order in which the classifications occur.

None of the prior implementations have this capability. Neither the Astronautics ZS-1 nor the Intel i860 can issue multiple core instructions simultaneously, nor can they issue a core instruction while simultaneously issuing or dispatching a floating-point instruction; they can only dispatch one core instruction concurrently with one floating-point instruction, directing them to their appropriate data paths where they are buffered, decoded, and issued singularly and independently. Whether they are launched into execution simultaneously is a function of two asynchronous scheduling processes synchronizing fortuitously.

The Intel i960 can issue up to three core instructions simultaneously but the order in which they must appear for simultaneous launch is restricted (i.e. they cannot be scheduled symmetrically). Further, the i960 has no capability to issue or execute floating-point instructions. The IBM RS6000 is capable of dispatching two fixed-point instructions simultaneously, but they are scheduled to issue singularly. The RS 6000 can also dispatch its two instructions independent of their order, but dispatching two instructions simultaneously for singular scheduling and singular issue is not the same as scheduling and issuing two instructions simultaneously.

A second way in which the preferred embodiment exceeds the performance of prior art embodiments is that through symmetric scheduling, the preferred embodiment does not require any special formatting or static scheduling to effectuate the method. Thus, the method remains virtually transparent to the programmer. The i860 requires a custom compiler which must pre-pair those instructions which it can dispatch simultaneously using a strict format, and must also set a special bit to notify the CPU when to begin and stop fetching and dispatching two instructions concurrently. While the second monolithic implementation, the i960, does not require a custom compiler to enable it to issue multiple instructions simultaneously, it does require a specialized compiler to optimize its performance (i.e. the compiler must attempt to rearrange the program code to minimize the impact of the i960's instruction ordering restrictions). The performance of the preferred embodiment can be optimized using well-known and commonly used static scheduling techniques, but this optimization is not necessary to enable multiple instruction launch scheduling; the preferred embodiment will simply exploit whatever instruction-level parallelism exists in the program code when it is executed.

A third benefit of the preferred embodiment over the prior art is that the method and apparatus of symmetrically scheduling multiple instructions simultaneously enables the instruction decode, operand access, and instruction launch scheduling functions to be performed in a single pipestage. Thus, the functions performed by the splitter stage (S), buffer stages (B and b), decode stages (D and d) and issue stages (I and i) of the ZS-1 pipeline are all performed in a single decode (D) pipestage by the preferred embodiment. Further, because the method employed by the preferred embodiment enables these functions to be performed in less time than the duration of other stages comprising the pipeline of the preferred embodiment, the reduction in pipestages over the prior art translates directly into a reduced average instruction execution time (the pipestage of the largest time duration constrains all of the other pipestages to that time duration).

Finally, the method and apparatus of symmetric instruction scheduling employed in the preferred embodiment is easily extended to embodiments with duplicative resources (i.e. embodiments which can execute two instructions of the same class simultaneously). For example, the preferred embodiment might have two arithmetic logic units, each capable of executing the same class of instructions. Thus, there would be sufficient resources to issue two instructions of that same class simultaneously. Further, the method employed can be easily extended to an embodiment fetching, scheduling and issuing more than two instructions at a time.

BRIEF DESCRIPTION OF THE DRAWINGS

FIG. 8 depicts an ideal pipeline stall resulting from a control hazard;

FIG. 9 depicts the more likely pipeline stall resulting from a control hazard;

FIG. 10 depicts the pipeline sequences which result from implementing a predict-not-taken scheme for both the branch not taken scenario (top) and branch not taken scenario (bottom);

FIG. 16 depicts the instruction format required by the Intel i860 to permit simultaneous multiple instruction dispatch;

FIG. 17 is a table which describes the sequence restrictions imposed by the Intel i960 to permit simultaneous multiple instruction launch;

FIG. 25 depicts the five instruction formats recognized by the preferred embodiment of the invention;

FIG. 26 depicts the bit fields necessary for the preferred embodiment to perform local decoding of each instruction type;

FIG. 28 lists the instruction packets executed by the preferred embodiment as Fast Constants;

FIG. 29 lists the instruction packets executed by the preferred embodiment as Fast Indexes;

FIG. 30 lists examples of packets which contain data dependencies detected by the Intrapacket Scheduling Logic;

FIG. 32 is a table depicting the classification of instructions for the preferred embodiment of the invention.

DETAILED DESCRIPTION OF THE INVENTION

A. Prior Approaches

Referring now to FIGS. 1–17, the following section discusses in more detail prior approaches to multiple instruction execution.

Figures 1, 2:
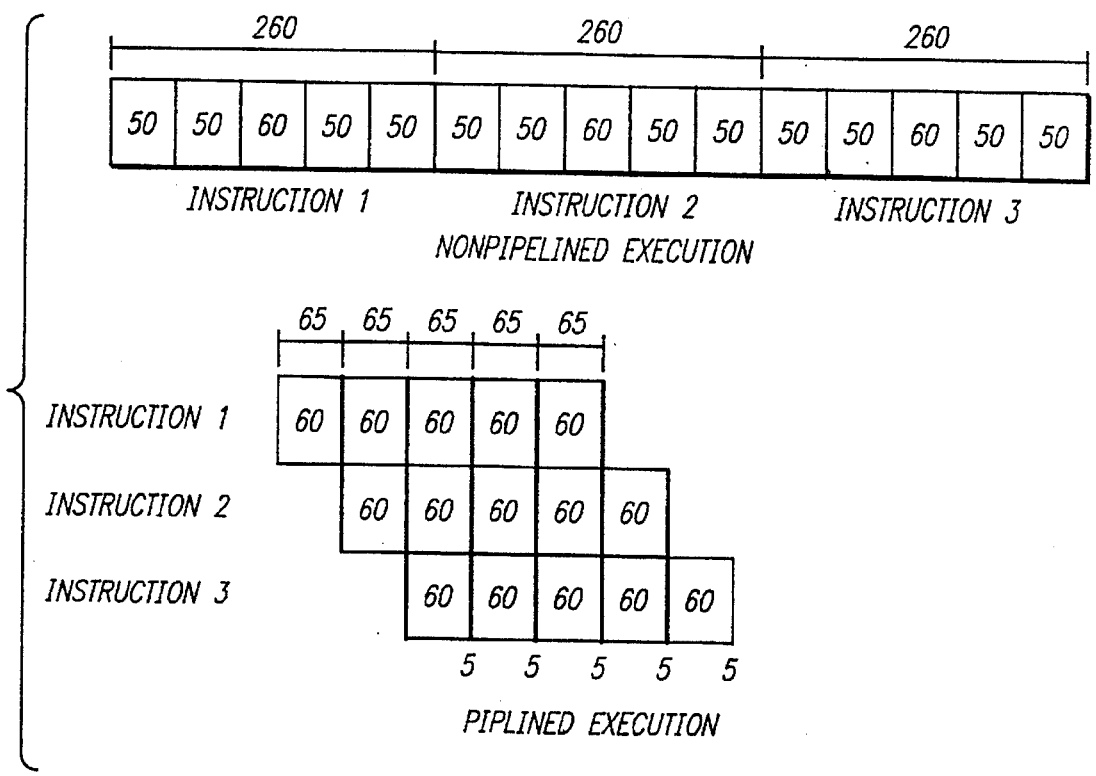
FIG. 1 is a comparison between sequential execution of three instructions to pipelined execution of the same three instructions.
FIG. 2 depicts an ideal pipeline which has perfect overlap of every instruction.

Referring to FIG. 1, an execution pattern for three instructions is shown for both a nonpipelined (400) and a pipelined (402) CPU. A single instruction for the nonpipelined version (400) is assumed to have an average execution time of two hundred sixty nanoseconds. For the pipelined version (402) the average instruction execution time is split into five stages (404) of execution, the longest of which is sixty nanoseconds. Thus, all five pipestages are constrained to sixty nanoseconds. Implementing the pipeline is assumed to add an additional five nanoseconds to each pipestage due to overhead, indicated in FIG. 1 by the shaded areas (406) between the pipestages. Therefore, each pipestage requires a total of sixty-five nanoseconds and each pipelined instruction advances to a new pipestage every sixty-five nanoseconds.

Notice that for the pipelined version, the total average execution time for a single instruction (the instruction latency) has increased to three hundred twenty-five nanoseconds as compared to the nonpipelined average execution time of two hundred sixty nanoseconds. For the pipelined version, however, an instruction will complete every sixty-five nanoseconds (once the pipeline is full). The nonpipelined version executes an instruction every two hundred sixty nanoseconds. The speedup achieved through pipelining is equal to the average instruction execution time of the nonpipelined version (i.e. 260 ns), divided by the average instruction execution time of the pipelined version (i.e. 65 ns), which equals a speedup of four times.

A RISC processor architecture (e.g. SPARC) can be implemented with five basic instruction execution steps: (1) instruction fetch (F); (2) instruction decode and operand access (D); (3) instruction execution (E), (4) data cache or memory access (C); and (5) write back (W). Instruction fetch (F) involves the issuance of an instruction address to a memory in which program instructions are stored, and the importation to the CPU of the instruction resident at that address for subsequent execution.

Instruction decode and operand access (D) involves the decoding of the instruction just fetched to: (1) ascertain the function to be performed and appropriately configure the execution resources to perform that function; (2) identify the operands on which to perform that function; and (3) access those operands identified (usually from the register file).

Instruction execution (E) involves the effectuation of the arithmetic or logical operation between the accessed source operands as specified by the decoded instruction, typically generating some result operand.

Data cache or memory access (C) is the step during which an effective address (calculated during (E)) is presented to the address inputs of a cache memory external to the CPU, accessing the particular memory location from which data is to be imported into the CPU, or into which data is to be stored from the CPU.

Write-back (W) is the step during which data, either imported from external memory during (C) or generated through some mathematical or logical operation performed during (E), is presented to the CPU register file (a small fast memory associated with the CPU) for storage therein. Also during (W), data to be stored in external memory is presented to the data inputs of the memory. The data presented to the register file input port is typically written into the register file on the positive edge of the pipeline clock which marks the end of (W). This is often referred to as update (U). Data presented to the external memory is typically written sometime before completion of (W).

Referring to FIG. 2, a depiction of the ideal operation of the above pipeline is shown. Ideally, an instruction will be fetched and begin its five-step execution process on every clock cycle. This ideal operation will yield a performance that is five times that of a CPU which executes the same instructions sequentially. The perfect overlapping of every instruction (the ideal case) requires the assumption that there are sufficient resources with which to perform all of the pipestages for any combination of instructions that might exist in the pipeline concurrently. The ideal case further presumes that an instruction just starting execution does not depend on the result of an instruction currently in the pipeline that is not yet completed (i.e. the instructions are parallel). Finally, the ideal case does not consider the difficulties incurred when an instruction just completed is an instruction which changes the program counter abruptly, such as a branch or call instruction.

With respect to resources, an ALU can be used to perform three distinct functions necessary to implement a RISC architecture: an effective data address calculation, a branch address calculation, and an ALU operation (e.g. add, subtract, exclusive or, etc.). A RISC instruction set is simple; each instruction specifies only one functional operation. Thus the one out of five instructions in FIG. 2 which currently occupies (E) (e.g. instruction i+1 in clockcycle 4) will specify only one ALU function; no overcommitment of the ALU is possible. Because an instruction fetch is performed on every clock cycle, however, the program counter (PC) must be incremented on each clock. The ALU is busy servicing (E) during every cycle; an additional incrementer is therefore required to complete (F). Additionally, sufficient resources must be available to permit two memory accesses per clock cycle; the (F) pipestage fetches an instruction from memory every clock cycle, while the potential exists during every clock cycle for the (C) stage to perform a memory access to retrieve or store data. Instructions are often stored in on-board (i.e. on the CPU chip) instruction caches, separate from data, to avoid memory access conflicts between the (F) and (C) pipestages.

Figures 3, 4, 5:
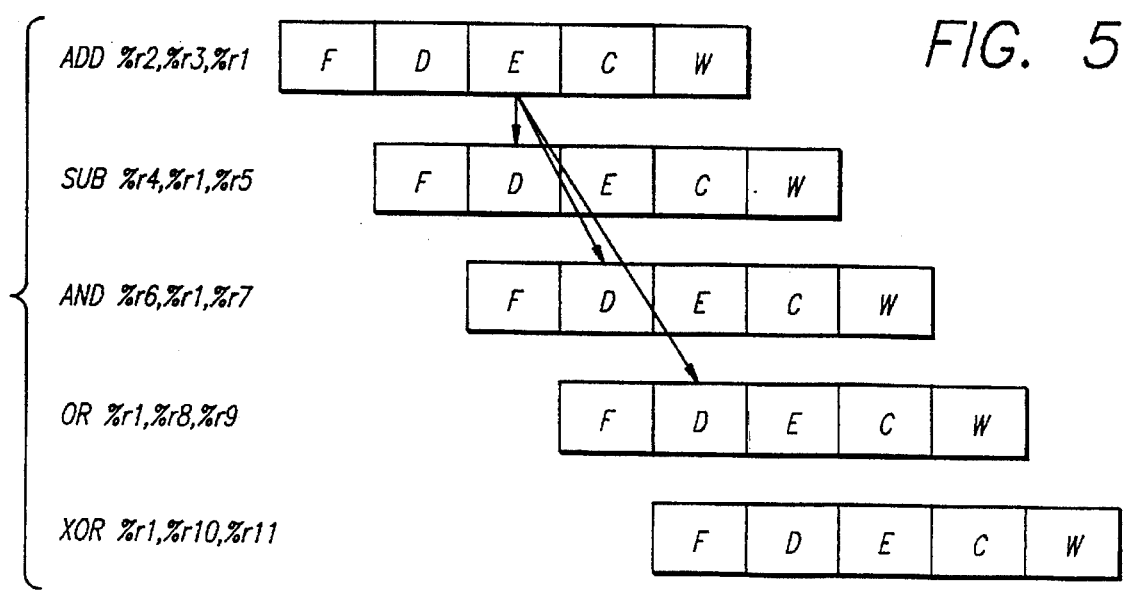
FIG. 3 depicts a non-ideal pipeline in which one of its instructions has stalled.
FIG. 4 depicts a load register instruction which is dependent for data re an add instruction, creating a data hazard.
FIG. 5 depicts forwarding data from an add instruction in its execution stage to three subsequent instructions as they enter their decode stages.

The circumstance under which the hardware cannot support all of the potential combinations of instructions that might be overlapped in execution is known as a structural hazard. Thus, if the (F) pipestage cannot obtain an instruction concurrently with a (C) pipestage data operand memory access, one of the pipestages must yield and suspend its operation until the next clock cycle. Any instructions proceeding ahead of the stalled instruction in the pipeline can be permitted to continue. Referring to FIG. 3, an example of a pipeline which has stalled for a structural hazard is illustrated. The structural hazard is the same as described above: a single port to external memory with two memory accesses attempted simultaneously. The (F) pipestage defers to the (C) stage and no instruction fetch (408) is initiated on clock cycle four.

Although a CPU with structural hazards will always have a greater CPI (and thus a lower performance) than a CPU without those structural hazards (all other design parameters remaining equal), structural hazards are nevertheless typically permitted as an engineering trade-off. Fully pipelining the memory access process can be costly in added circuitry, additional interconnect, pin count and package characteristics. These are particularly important considerations for monolithic CPU designs (i.e. single-chip) where chip area and packaging limitations are of paramount concern. If the structural hazard is not likely to arise often, the cost of its elimination may not be worth the minor improvement in CPU performance.

Pipelining also creates hazards which can occur when instructions just entering the pipeline require as operands, the results from operations performed by instructions at more advanced stages in the pipeline but which have not yet updated the register file. This situation is known as a data hazard. Computer programs are intended to execute sequentially or "in-order." Nonpipelined CPU's always completely execute one instruction at a time, performing the specified operation on the appropriate data and storing the results of that operation back into memory (for RISC processors the result is typically stored in a register). Thus, if the next instruction must use that result in performing its operation (i.e. a source operand), the result from the previous instruction is available from memory or a register file, right where the next instruction expects it.

Pipelining can change the order of access to operands from that which is expected during sequential execution. Consider the pipelined execution of the following SPARC instructions: add % $r_1$, % $r_2$, % $r_3$ and ld [% $r_3$+% $r_4$], % $r_5$. The integer add instruction adds the contents of register one to the contents of register two, and stores it into register three. The ld (load) instruction adds the contents of register three to the contents of register four to calculate an effective address, then retrieves the data stored in memory at that address and stores it in register five.

FIG. 4 illustrates the overlapping of these two instructions in pipelined execution. Data is read (i.e. source registers are accessed for operands) for the ld instruction 410 in pipestage (D) 412 during clock cycle three, but the result operand generated by the integer add instruction 414 is not written back into the register file (i.e. stored in destination register $r_3$) until the end of pipestage (W) 416, or clock cycle five. The effective address calculated by the ld instruction 410 will be erroneous unless either the ld instruction 410 is stalled until the add instruction 414 completes (W), or the data can be made available to the ld instruction 410 as soon as it is calculated.

A hardware technique called forwarding or bypassing can be used to alleviate this problem, thereby restoring the independence or parallelism between the otherwise dependent instructions. The ALU output is always fed back into both ALU inputs through multiplexers. Control hardware can be made to detect when the result from the ALU is needed by an instruction currently in the (D) pipestage; the multiplexer feeding the appropriate input of the ALU can then be caused to select its data from the results output, rather than the register file.

FIG. 5 illustrates a set of five instructions which might overlap in a pipeline. The integer add instruction 418, which is the first instruction to enter the pipeline, ultimately writes its result to its destination register ($r_1$). The four subsequent instructions all use register $r_1$ as a source for one of their operands. The sub 420, and 422 and or 424 instructions all access $r_1$ while they are in the (D) pipestage, all prior to the time at which the add instruction 418 updates $r_1$ with its result (i.e. at the end of (W)). The xor instruction 426 does not enter the (D) pipestage until after the add instruction 418 has updated register $r_1$. Thus, as many as three adjacent instructions can potentially be dependent upon the result generated by an instruction which immediately preceded them into the pipeline. Hardware must be implemented to bypass the register file and provide the result directly to these instructions while they are each in (D) to avoid stalling the pipeline.

Figures 6, 7:
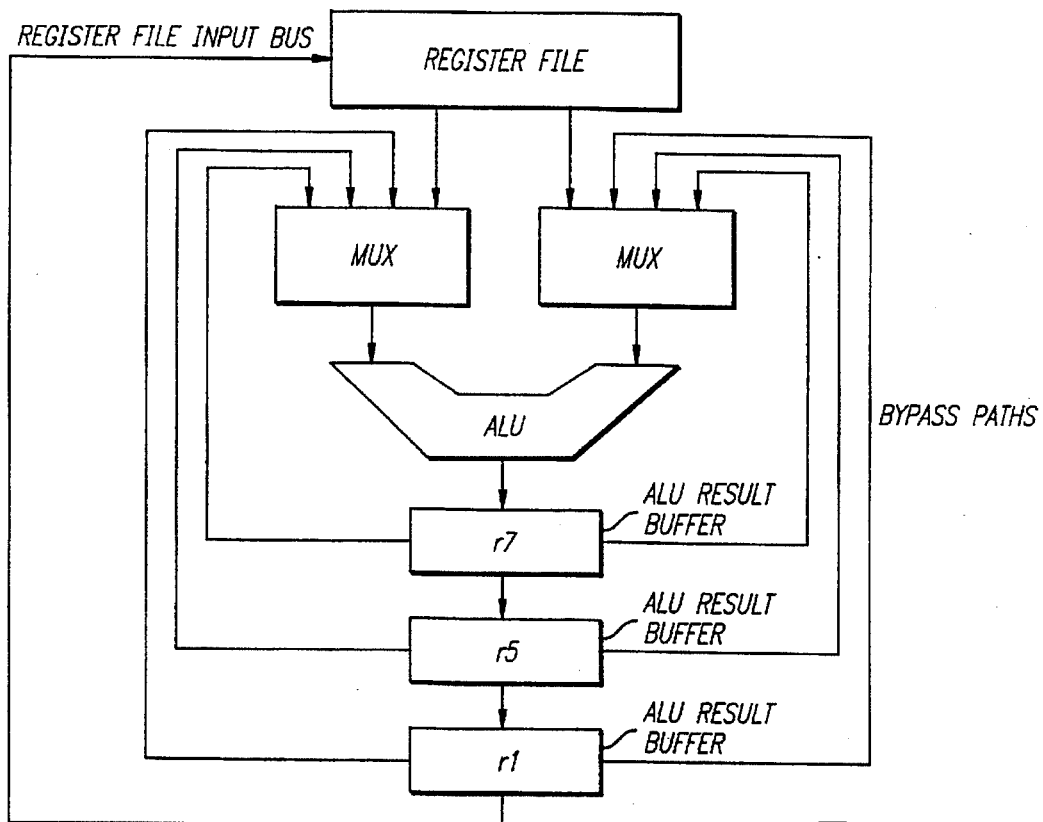
FIG. 6 depicts the forwarding scheme by which the data forwarding required in FIG. 5 can be accomplished.
FIG. 7 depicts an add instruction which is dependent on an immediately preceding load register instruction, creating a pipeline interlock which stalls the entire pipeline one clock cycle.

FIG. 6 illustrates a simple conceptual diagram of the required ALU bypass or forwarding scheme; the required detection and control circuitry is not shown. Although the result from the add instruction (418, FIG. 5) is available as early as the end of pipestage (E) (428, FIG. 5), the ALU pipeline is extended with the three buffers (430, 431, 432) to match the number of stages in the memory access pipeline (i.e. (D) and (W) stages are added).

Although the above described data hazard (known as a read after write or RAW) is the most common type, there are two other types that should be mentioned. They are a write after read (WAR) and a write after write (WAW). The WAR hazard is most likely to arise when instructions occurring later in a program sequence are permitted to bypass stalled instructions which occur earlier in the program sequence. As a result, the bypassing instruction may write the register file with its result before the bypassed instruction can proceed with accessing its operands. If the bypassing instruction writes to a register to be used as a source of an operand by the bypassed instruction, the bypassed instruction will obtain an incorrect operand value. Permitting "out-of-order" execution of instructions is typically associated with floating-point operations, where instruction latency varies greatly with the type of instruction. "Out-of-order" execution creates additional complexity in the control circuitry necessary to avoid WAR hazards and will be discussed in more detail later.

The WAW hazard also occurs when an instruction is permitted to execute out-of-order, potentially updating its destination register too soon. This creates the potential for an instruction, which should have already updated the same register, to do so later and thereby overwrite the appropriate data. This hazard can also occur when a pipeline permits the update of registers in more than one pipestage. In our example above, illustrated by FIGS. 5 and 6, the result of an ALU operation could be written into the register file 433 at the end of the execute (E) pipestage 428. If this were permitted, however, a register load operation, upon reaching the (W) stage, might be required to store a result to the same register. Although the ALU instruction might follow the load operation in the program instruction sequence, the ALU instruction might reach the end of (E) and write its result before (or at the same time) the later occurring load instruction reaches the end of (W); the operand in the register would therefore not be the result of the more recent instruction in the program sequence. The pipeline in FIG. 6 solves this problem by adding the three buffers (430, 431, 432) to the output of the ALU 434, thus deferring the availability of the ALU result to the register file 433 until the (W) pipestage.

Data dependencies on the results from instructions with a latency of one clock cycle (i.e. the result is available within one clock cycle after beginning execution) such as the ALU add instruction 418 in FIG. 5, can be resolved using forwarding so that no pipeline stall is necessary. Dependencies on instructions with latencies greater than one, however, cannot be so resolved. A load instruction is a good example. The load instruction 436 of FIG. 7 has a latency of two cycles: the execute (E) pipestage 437 first calculates the effective address, the cache stage (C) 438 then presents the address to memory to access and import the data back into the CPU. Thus, an instruction which immediately follows a load instruction into the pipeline, and which uses the result obtained by the load instruction as a source operand (e.g. add instruction 439), must wait one cycle in (D) 440 until the operand can be forwarded. FIG. 7 illustrates the effect of this stall 440 on the pipeline. This type of data hazard detection is called a pipeline interlock.

Software compilers have been written which can rearrange the instructions in a program to avoid these pipeline stalls. The compiler interposes a number of independent instructions between the dependent instructions, equal to the latency of the instruction causing the delay minus one. This process serves to increase the independence, or parallelism, between the instructions. Of course, the rearrangement of code cannot be permitted to affect the sequential flow of the program. Thus, there will be many dependencies which cannot be rescheduled. This method of instruction scheduling is called static scheduling; rescheduling is performed by a compiler prior to executing the program.

The last class of hazards which prevent the pipeline from being ideal (i.e. completely overlapped) are control hazards. Control hazards are created when one of the instructions in the pipeline turns out to be a control transfer function, such as a branch on condition. A branch instruction may change the program counter (PC) to some value other than the next sequential address if the branch is taken; if the branch falls through (i.e. not taken), the PC will reflect the address of the next instruction in sequence (usually the PC for the previous branch instruction plus four). A branch instruction must calculate the target address and evaluate the specified condition before the transfer of control (i.e. replacing the current PC with the new target address) can be effected. The update of the PC with the target must therefore typically wait until the cache stage (C). The target is calculated by the ALU in (E) so that even if the branch condition can be evaluated sooner, the target address could not be loaded into PC until the beginning of (C). This is too late for the instruction fetch which occurs concurrently with (C).

FIG. 8 illustrates the ideal stall which must occur in the pipeline. With branch instruction execution as described above, the pipeline will stall for three clock cycles before instruction fetch can be resumed. Because the CPU will not recognize instruction i 442 to be a branch until it is decoded in pipestage (D) 443, decode will occur too late to prevent instruction i+1 444 from being fetched. FIG. 9 illustrates this more realistic pipeline, which shows that instruction i+1 444 will be refetched at the target address 445. If the branch is not taken, however, the same instruction is fetched twice (446) for instruction i+1 (444).

One solution to improve branch performance (i.e. reduce the number of stalled cycles) is to evaluate the branch condition earlier in the pipeline and, if possible, calculate and make available the target address sooner in the pipeline. The branch condition could also be evaluated earlier, in the decode (D) pipestage 443. To be effective, however, the target address must be calculated and made available before the end of (D) 443; knowing that a branch is to be taken does no good if the target address for that branch has not yet been ascertained. This scheme would stall the pipeline only one clock cycle, postponing the next instruction fetch until the (E) stage 447 of the branch.

Another scheme using the improved method just described, is to predict the branch will not be taken: rather than stall the pipeline, assume the branch will not be taken and fetch the fall-through instruction (i+1 450, FIG. 10). If the branch (i 452, FIG. 10) is not taken, there will be no penalty clock cycles and the pipeline will continue with no stalls. If the branch (i 454, FIG. 10) is taken, the fetch process is reinitiated at the branch target 456 and the pipeline loses one clock cycle. FIG. 10 illustrates the predict-not-taken scheme for the "branch untaken" and "branch taken" cases. Of course, the performance realized will depend on the percentage of branches taken and not taken. A further complication can develop if the fall-through instruction itself changes the state of the CPU, and the resolution of the branch condition is not made prior to this change of state. Complex hardware could be required if the change of state must be undone when the branch is supposed to be taken.

An alternative method would be to predict the branch as taken, but this method is helpful only in circumstances when the branch target address is known prior to the evaluation of the branch condition. Some machines have more complex conditions which make their evaluation more complex and thus slower. If branches are taken on average more often than not, this process could be a slight improvement over branch-not-taken schemes. Predict-taken schemes have the same potential complexities, resulting from premature changes in machine state, as the branch-not-taken schemes.

A third alternative is called a delayed branch. The delayed branch relies on static instruction scheduling (i.e. instruction reordering at compile time), much like that used to eliminate load/store pipeline stalls described earlier. The branch instruction pipeline described above has a branch delay of one cycle. Thus, if the software compiler can insert an instruction immediately following the branch which is useful and must be executed regardless of whether the branch is taken, there will be no stall in the pipeline. For a branch delay of n cycles, n instructions must be inserted to eliminate stalls. These instructions are called delay-slot instructions (dsi).

Figures 11, 12:
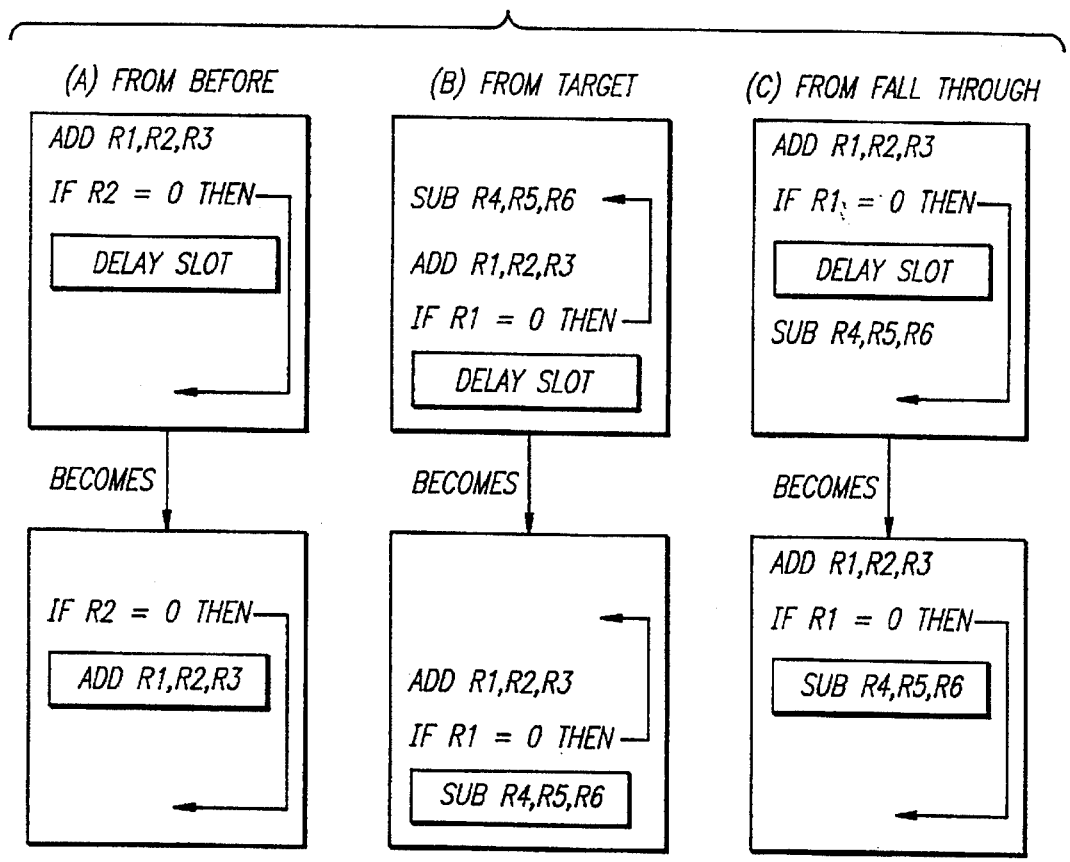
FIG. 11 depicts three different schemes for statically scheduling (and thereby eliminating) a branch delay.
FIG. 12 describes potential causes of interrupts which require stopping and restarting program execution, along with the pipeline stage in which they typically occur.

FIG. 11 illustrates three different schemes which can be used to implement the static scheduling of delay-slot instructions, and thereby increase instruction parallelism. Strategy (a) schedules an instruction 458 in the delay slot 459 which originally was specified before the branch. This instruction must be independent of the branch instruction 460 (i.e. the add instruction 458 does not create a result used by the branch instruction 460 in any way). Strategies (b) and (c) are used when there are no independent instructions which may be rescheduled from before the branch. Strategy (b) reschedules the target instruction 461 in the delay slot 462 (the instruction is copied rather than moved if the target instruction can be reached by some other path through the program). Strategy (c) simply uses the fall-through instruction 463. Strategy (b) is preferred over Strategy (c) if the branch has a high probability of being taken (e.g. a loop branch). Strategy (a) is obviously preferred over (b) and (c) whenever possible. For both (b) and (c) to be permissible, the dsi (462, 464) must be executable without effect on the unexpected path if taken, even though its execution will be wasted.

Another impediment to the effective implementation of pipeline architectures is the handling of interrupts. Interrupts are events which alter the normal flow of program execution, often resulting from some error in the program. Other terms for these events have evolved, including exceptions, faults, aborts and traps. Often when such an event is recognized, the CPU is directed to some routine designed to alleviate an error or perform some task. The CPU will return to the instruction which caused an error and restart program execution. The CPU might also return to the instruction following the instruction causing the interrupt, and resume program execution from there if the interrupt were merely to perform some task (i.e. not an error).

Pipelines make the handling of interrupts complex. The overlapping of instructions creates difficulties because an interrupt can force the CPU to cease execution before many instructions have completed. Thus, the task of ascertaining which instructions have updated the machine state, and therefore how much to undo before restarting execution, is made extremely complex. Further, interrupts can be caused in different stages of the pipeline, depending upon the instruction causing it. FIG. 12 lists certain problem interrupts (i.e. those which occur within instructions and must be restarted), and the pipestage in which they will occur.

When an interrupt occurs, the state of the machine at the time the interrupt occurs must be preserved so that execution may be properly restarted once the interrupt has been cleared by the appropriate interrupt routine. This can be accomplished in the pipeline by forcing a trap instruction into the pipeline as soon as the error is recognized. A trap instruction forces the CPU to execute an interrupt handling routine appropriate for clearing the type of error (or performing the required task) which caused the interrupt. As soon as the trap instruction is issued, no writes to memory should be permitted by either the faulting instruction or any of the instructions which follow it in the pipeline. This prevents any update of registers (i.e. machine state changes) that could make restarting execution from the faulting instruction impossible. Once in control, the interrupt handler routine should save the PC of the faulting instruction, and use this PC to return the CPU to program execution once the error is cleared.

Complications occur when the previously described delayed branch is used. If the dsi causes the fault, and the branch is taken, two PC's must be saved to resume proper execution. First, the PC for the faulting dsi must be saved and second, the target address for the branch must also be saved; the branch is already executed and will therefore not recalculate the target, and the two PC's are not sequential.

Another difficulty emerges if the faulting instruction, or one which follows the faulting instruction in the pipeline, changes the machine state prior to the recognition of the interrupt (or prior to its being handled). If this is permitted to occur, hardware may be necessary to enable the CPU to back out of any such changes. Further, because interrupts may be caused by instructions in various pipestages (see FIG. 12), interrupts may occur out of order; an instruction later in the pipeline may cause an interrupt before an earlier instruction. This might be handled by maintaining a status vector for each instruction as it moves through the pipeline, and checking each instruction status vector for interrupts only at some fixed point in the pipeline (i.e. the (W) pipestage).

Finally, implementing a pipeline with functional execution units requiring varying numbers of multiple execution cycles can be most difficult. In the discussion thus far, the only operations were simple integer arithmetic or logical operations that required at most one clock cycle to execute. Operations performed on fractional numbers (i.e floating-point operations) may require many clock cycles to complete. Forcing all such instructions to execute within the same number of clock cycles would create an impractically deep pipeline, propagating a huge number of dependencies which must then be bypassed through data forwarding.

To handle the longer and variable latencies of execution encountered with floating-point operations, the floating point pipeline has been implemented using a multiple (E) cycle (as many as needed to complete the operation) for each functional unit, with multiple functional units in parallel.

Figures 13, 14A:
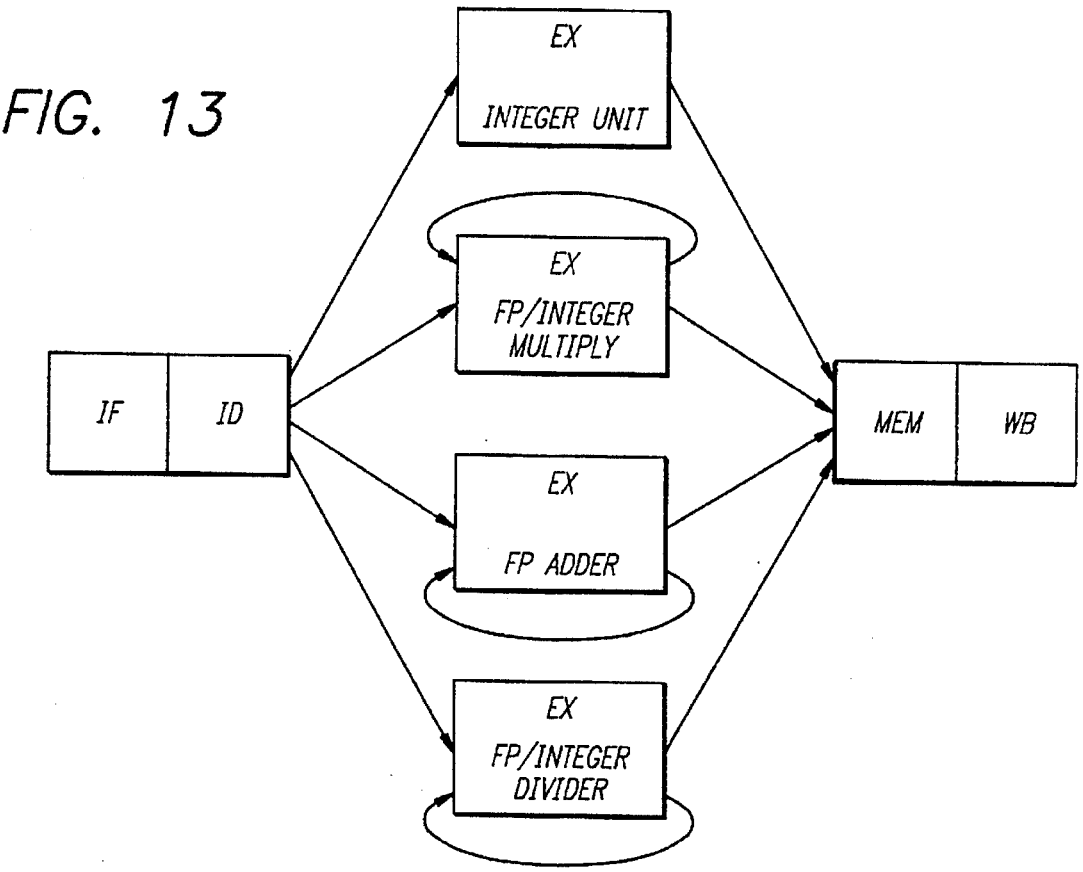
FIG. 13 depicts the expansion of a sequential pipeline execution stage by implementing multiple execution units in parallel.
FIG. 14(a) depicts an ideal superscalar pipeline which launches two instructions simultaneously every clock cycle.

The functional units themselves (just as with the ALU used for integer operations) are not pipelined, so only one instruction may occupy a functional unit at a time. An example of this expanded pipeline is shown in FIG. 13. The (E) stage of a floating-point divide 466 might be repeated thirty to fifty times, whereas a floating-point add 468 might require only five (E) cycles. Thus, a means to keep track of dependencies between instructions in multiple functional units with variable latencies had to be devised. These dependencies include those between instructions executing in the FP units, and instructions executing in the Integer Unit (primarily limited to floating-point memory references).

The first technique used, known as scoreboarding, appeared in Control Data Corporation's CDC 6600 machine. This technique detects dependencies by tracking the use of the registers as destinations and sources by each functional unit. The system dispatched instructions to an appropriate execution unit provided that the required execution unit is available and no WAW dependencies exist. An instruction that requires the result of another instruction executed by a different functional unit as one of its source operands, is delayed from issuing until that result has been written back to the register file. Because later dispatched instructions might finish earlier than earlier dispatched instructions (due to the differences in execution latency), contention for the register file write port is created. The central control unit (or scoreboard) issues independent instructions, controls access to the register file, issues dependent instructions waiting for results once those needed results have been updated in the register file, and also postpones the updating of the register file by the result of a completed instruction if an instruction waiting to be executed still requires the old value (a WAR hazard).

This technique will permit independent, later-dispatched instructions to complete ahead of earlier-dispatched instructions (out-of-order). This technique is called dynamic instruction scheduling, and performs the same function at run-time that static instruction scheduling performs at compile time: the rescheduling of program instructions to avoid hazards (i.e. structural, data and control). The scoreboarding technique permits independent instructions to bypass those instructions which have stalled because they are waiting for a busy functional unit, or because they are dependent on data from other instructions. This technique creates complex problems for handling interrupts, however, because the later instructions permitted to complete earlier may have changed the machine state such that it is extremely difficult to back those changes out for a proper restart.

Another approach to dynamic scheduling in the context of parallel floating-point execution units was used in the IBM 360/91 Floating-point Unit. Known as the Tomasulo Algorithm, this technique differs in two major respects from the CDC 6600 scoreboard. First, hazard detection and execution control are distributed to each functional unit rather than centrally controlled through a scoreboard. Second, the functional units receive their dependent operands straight from the functional units which have generated them; the operands are forwarded directly rather than waiting for them to be stored first in the register file, then accessing them from there. Additionally, because the destination and source registers are essentially renamed according to the unit which will generate them, problems involving WAW and WAR hazards are eliminated. Both of these approaches, although powerful, are highly hardware intensive and both engender even more hardware complexity to handle interrupts.

Pipelining is a technique which exploits instruction-level parallelism through overlapping instruction execution (i.e., the execution of an instruction is broken down into a series of semi-independent stages so that multiple instructions may be simultaneously overlapped while executing) to reduce CPI to somewhere near one. Further performance improvement can be achieved if the CPI is reduced to less than one, thereby causing the instruction execution rate to exceed the clock rate. To lower the CPI to less than one, however, more than one instruction (on average) must be issued for execution every clock cycle. The ability to issue (or launch) multiple instructions per clock cycle enables the CPU to exploit even greater levels of instruction-level parallelism (i.e. to overlap even greater numbers of independent instructions in execution). Issuing more than one instruction per clock cycle, however, also compounds the difficulties outlined above in decoding, scheduling and controlling such a pipeline successfully; potential instruction dependencies multiply. A CPU that can issue multiple instructions per clock cycle, where the program is properly scheduled statically by a compiler, has been coined "superscalar." FIG. 14(a) illustrates an ideal superscalar pipeline with CPI equal to one-half.

The difficulties in scheduling multiple instructions for simultaneous issue has seriously limited the performance gains realized by previous attempts to implement such a CPU. Recent implementations impose severe restrictions on the classes of instructions capable of issuing simultaneously, thereby constraining performance improvements to narrow applications. Further, this limited improvement in performance has come at a great cost in both increased hardware and compiler software complexity.

Increased hardware complexity makes monolithic (i.e. single-chip) implementation of superscalar CPU's extremely costly and difficult; the cost of an integrated circuit increases exponentially with chip area and is further limited by packaging and pin constraints. Dependence on sophisticated compilers to statically schedule code and thereby reduce some of the hardware complexity is itself costly while constraining users to a compiler developed especially for the CPU and its particular instruction set architecture.

Figures 14B, 15:
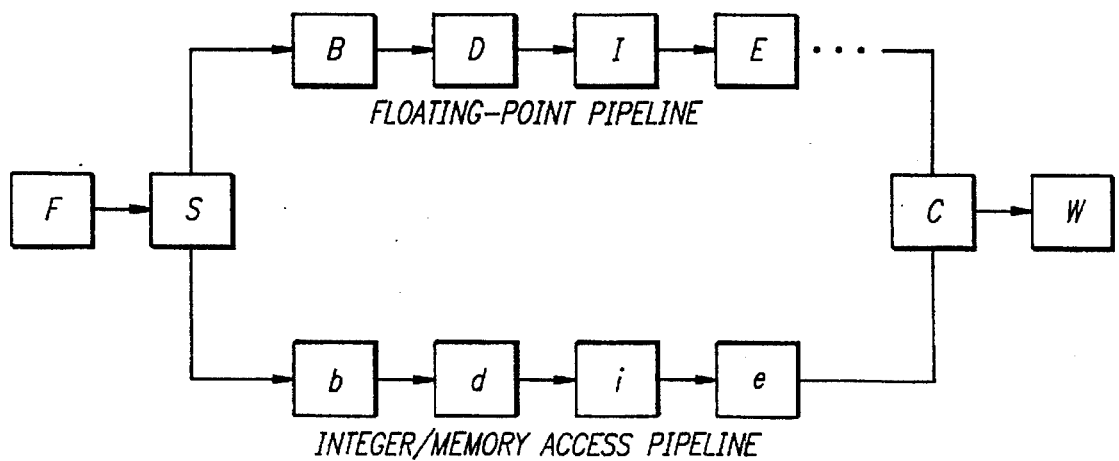
FIG. 14(b) depicts the ideal superscalar pipeline in FIG. 14(a) which exploits a decoupled architecture.
FIG. 15 is a block diagram representation of the Astronautics ZS-1 decoupled architecture.

The most common technique in superscalar implementation exploits a decoupled architecture; that is a separation of the integer and floating-point functions such that each type of instruction flows through a separate pipeline. FIG. 14(b) illustrates an ideal decoupled superscalar pipeline. Decoupling is inherent because each instruction type operates on a different type of operand (i.e. integer v. floating-point); therefore there is no overlap of registers between them. Thus, each functional unit type can access its own dedicated register file and there can be no data dependencies between them. One pipeline performs the integer (i.e. fixed-point) and memory access operations (i.e. loads and stores), while the other pipeline performs all of the floating-point operations. An instruction of each type can be simultaneously dispatched to its appropriate pipeline, where each instruction is then issued (or launched) under control of its respective pipeline. Thus, these two independent and asynchronous pipelines make it possible for two instructions to issue simultaneously.

There are two potential sources of conflict between these two pipelines which must be dealt with. Because the memory access function is shared between the two instruction streams (i.e. they both share the same effective address calculator and address bus), a floating-point memory access might depend on the result of a floating-point operation several cycles long. Thus, either the integer pipeline must be stalled until the result is available, or the effective address must be calculated and saved somewhere until the result is available. The latter solution permits the integer pipeline to bypass stalled dependent floating-point memory accesses, but such out-of-order execution creates its own hardware complexities as previously discussed. The second potential source of conflict exists if the CPU supports direct moves of operands between register files. Again, this feature can be supported with increased complexity in the hardware.

FIG. 15 illustrates the two independent instruction pipelines of the ZS-1 processor developed by Astronautics Corporation of America. During instruction fetch (F) 470, two instructions are fetched if they are a combination such that one would be processed by an integer functional unit, and one would be handled by a floating-point functional unit. Branch instructions, and those memory access instructions which provide direct memory addressing, must be fetched singularly. If two instructions are fetched together, they are dispatched to their appropriate pipelines by the (S) pipestage 472. Branch instructions are held in (S) 472 and are executed there.

Floating-point operations are dispatched to buffer B 474, while fixed-point and register memory access instructions are dispatched to buffer b 476. The buffers serve two purposes: One, to keep the (S) pipestage 472 free; the second is to permit the fixed-point and memory access instructions (with execution latencies typically shorter than floating-point operations) to be dispatched well ahead of their floating-point counterparts. Thus, each pipeline is permitted to run asynchronously with the other.

The buffered instructions proceed singularly through the decode (D 477 and d 478) and issue (I 479 and i 480) pipestages. An instruction waits in its issue stage until the appropriate execution or functional unit becomes available, and any data dependencies it may have are resolved. Operands are accessed in the issue stage (479,480) just before execution begins. Other instructions are not permitted to bypass those instructions which are stalled for structural or data hazards, insuring strict in-order execution; this simplifies the control hardware.

A simplified scoreboarding technique (also simplified due to in-order execution) is implemented to detect data dependencies and resource conflicts, as well as to control access to the register file write bus for each of the two pipelines. Instructions are issued (or launched) into their execution stages (i.e. E 481 and e 482) when all dependencies are resolved, under command of the scoreboard control hardware. Store instructions generate addresses which are queued up to wait for the result which they are to store in external memory. Load instructions are permitted to bypass stores provided they do not write to the same memory address.

There are several significant limitations with this method and implementation. First, unless the program has significant numbers of floating-point operations, insufficient instruction level parallelism will exist to support dispatching multiple instructions simultaneously. Indeed, even a highly math-oriented program like Spice is likely to have only fifteen to twenty-five percent floating-point instructions. Second, branch instructions must be issued singularly. Third, the implementation depends on a compiler to statically arrange its code to pair what floating-point instructions are available with fixed-point and memory access instructions before running the program. Fourth, the pipeline has an increased number of stages; a splitter stage (S 472), a buffer stage (B 477 and b 478) and an issue stage (I and i) have been added to the simple five-stage pipeline previously described. This increases the overall execution time for a single instruction and thereby offsets gains made in performance otherwise realized through simultaneous instruction issue. Finally, instructions are not actually scheduled to launch simultaneously; they are merely dispatched to separate pipelines which then issue their respective instructions independently of one another. Two instructions launching simultaneously is a mere fortuity between two otherwise independent and asynchronous processes.

Two single-chip superscalar architectures have been implemented by Intel Corp., but they both suffer from many of the same limitations described above with respect to the ZS-1. The Intel i860 is quite similar to the ZS-1 in that it also employs a decoupled architecture creating two distinct and asynchronous pipelines: one associated with its floating-point unit, the other with its so-called core (integer) unit. This implementation is even more restrictive; it not only requires a compiler to arrange (where possible) floating-point and core unit instructions (i.e. integer operation and control instructions) in pairs (like the ZS-1, the only kind of dual instructions it can process), but it also requires the core instructions to always be the most significant thirty-two bits of the instruction pair. Further, the CPU relies on the compiler to set a special bit in the floating-point instructions to notify the CPU when to enter and exit dual instruction dispatch mode. Finally, these instructions can only be fetched in pairs on an even-word boundary. These restrictions make the scheduling of instructions easy on the CPU and so reduce hardware complexity, but they increase compiler complexity and limit performance and flexibility. Just as with the Astronautics ZS-1, the i860 can only dispatch these limited instruction pairs concurrently; they are issued for execution independently and asynchronously from one another by scoreboard control circuits independently associated with the two separate pipelines.

FIG. 16 illustrates the strict format into which instructions must be compiled to enable multiple instruction dispatch per clock cycle. The bit which must be set in the floating-point operation to alert the CPU to enter dual instruction dispatch mode is indicated by the "d." 486 appended to the floating-point operation (fp-op). If a floating-point instruction is encountered by the CPU with a set "D-bit" (i.e. d.fp-op), the CPU will process one more instruction singularly and then begin fetching and dispatching instructions in dual mode. The CPU instruction continues in dual mode until one instruction fetch beyond the point where it encounters an fp-op with a cleared "D-bit." Thus, the CPU must be told when to fetch and dispatch two instructions and must be presented with those instructions, paired in proper format, at the appropriate time; a specialized compiler must perform the scheduling for the CPU.

The Intel i960 eliminates floating-point capability, concentrating solely on core unit functions (i.e. integer register operations (R), memory access operations (M) and control operations (C)). The i960 establishes separate pipelines for each of the three core unit functions. The i960 is capable of issuing up to three instructions simultaneously, one into each of the three pipelines. The order in which these three instructions can appear is severely limited. For instructions to issue simultaneously, a memory access instruction must follow any integer register instruction paired with it, and any control instruction (e.g. branch on condition) must follow any register operation or memory access instruction with which it is grouped. Instruction scheduling is therefore not symmetric with respect to the three classes of instructions.

FIG. 17 illustrates the groupings of instruction types which are permitted to issue simultaneously. If a sequence of instructions in the order of CMRR is presented to the i960 instruction scheduler, it must issue all four instructions singularly (i.e. one at a time). If the sequence encountered is RMRC, the second register instruction can be bypassed to issue three instructions simultaneously, provided the control instruction (C) is not dependent on the second (R) instruction for data. This out-of-order execution, which does recover some of the performance lost due to the instruction order restrictions, comes at greater cost in chip area because the scoreboarding logic which dynamically re-schedules the instructions is very hardware intensive. Further, the logic required to handle interrupts also becomes more elaborate. The cost of performance would be much lower if this chip area could instead be used to provide floating-point capability.

The IBM RS/6000 is a board level implementation of a superscalar CPU. The RS/6000 can fetch up to four instructions per clock cycle. The RS/6000 also decouples its fixed-point operations and floating-point operations, and like the Astronautics ZS-1, holds control transfer instructions in a dispatch unit for execution there. Much like the ZS-1, the RS/6000 buffers its Fixed-point unit and Floating-point unit so that instructions are merely dispatched to appropriate buffers. Instructions are decoded and issued under the control of scheduling circuits separately associated with each unit. Each unit only issues one instruction at a time. Any simultaneous issue of instructions is simply the fortuity of two separate schedulers issuing instructions singularly and independently, but concurrently.

B. Preferred Embodiment of the Invention

Figure 18:
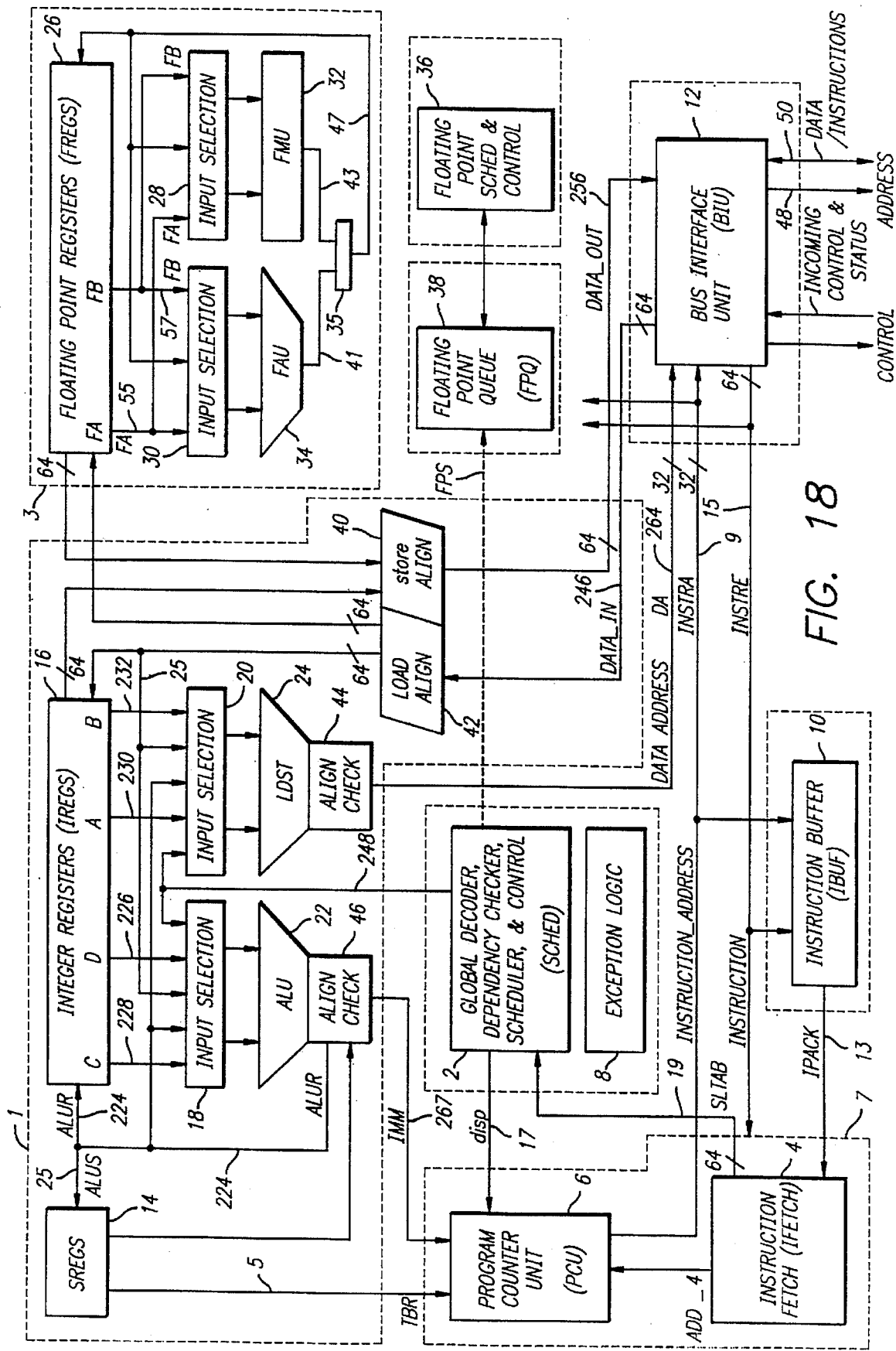
FIG. 18 is a high level block diagram of the Pinnacle 1 CPU 1 the preferred embodiment of the instruction)

Referring to FIG. 18, a block-level description of the preferred embodiment of the invention is shown. The preferred embodiment has two distinct data paths: the Core Data Path (CDP) 1 and the Floating-point Data Path (FPDP) 3. The architectural decoupling of these two data paths is made possible by dedicating a separate register file to each. Thus, data dependencies cannot result between Core instructions and Floating-point instructions. Although the preferred embodiment of the invention has been defined in the context of the SPARC RISC instruction set architecture, those skilled in the art can readily apply the invention to other instruction set architectures.

The CDP 1 is comprised of an Arithmetic and Logical Unit (ALU) 22, a Load and Store unit (LDST) 24, an Integer Register File (IREGS) 16 and a Special Register Unit (SREGS) 14. The ALU executes all of the SPARC integer operation instructions, including integer arithmetic instructions (i.e. add, addcc, addx, addxcc, sub, subcc, subx, subxcc, mulscc, umul, unmulcct smul, smulcc, srl, sra, sll, sethi, taddcc, taddcctv, save and restore), integer logical instructions (i.e. and, andcc, andn, andncc, or, orcc, orn, orncc, xor, xorcc, xnor and xnorcc), special register read and write instructions (i.e. rdy, rdasr, rdpsr, rdwim, rdtbr, wry, wrasr, wrpsr, wrwim, and wrtbr) and fetch control instructions jmpl, rett and flush. For a detailed description of the SPARC instruction set, refer to Chapter Six of the Cypress Semiconductor "SPARC RISC User's Guide." All instructions executed by ALU 22 have a latency of one clock cycle, except umul, umulcc, smul and smulcc which have a latency of up to eighteen clock cycles. For purposes of the fetch and control instructions, the aligned effective address is presented to the Program Control Unit (PCU) 6 on thirty-two bit bus IMM 267.

The LDST Unit 24 provides the execution resource for both the integer and floating-point register load and store type instructions (i.e. ldub, ldsb, lduh, ldsh, ld, ldd, lduba, ldsba, lduha, ldsha, lda, ldda, stb, sth, st, std, ldstub, swap, stba, stha, sta, stda, ldstuba, swapa, ldfsr, ldf, lddf, stfsr, stf, stdf and stdfq). LDST Unit 24 calculates the thirty-two bit effective address required for each of the above instructions, and all load and store type instructions require one lock cycle to generate effective addresses. In the case of the load and store instructions, the thirty-two bit effective address is checked for proper alignment by align check 44 and is presented to Bus Interface Unit (BIU) 12 on thirty-two bit bus DA 264.

Figure 19:
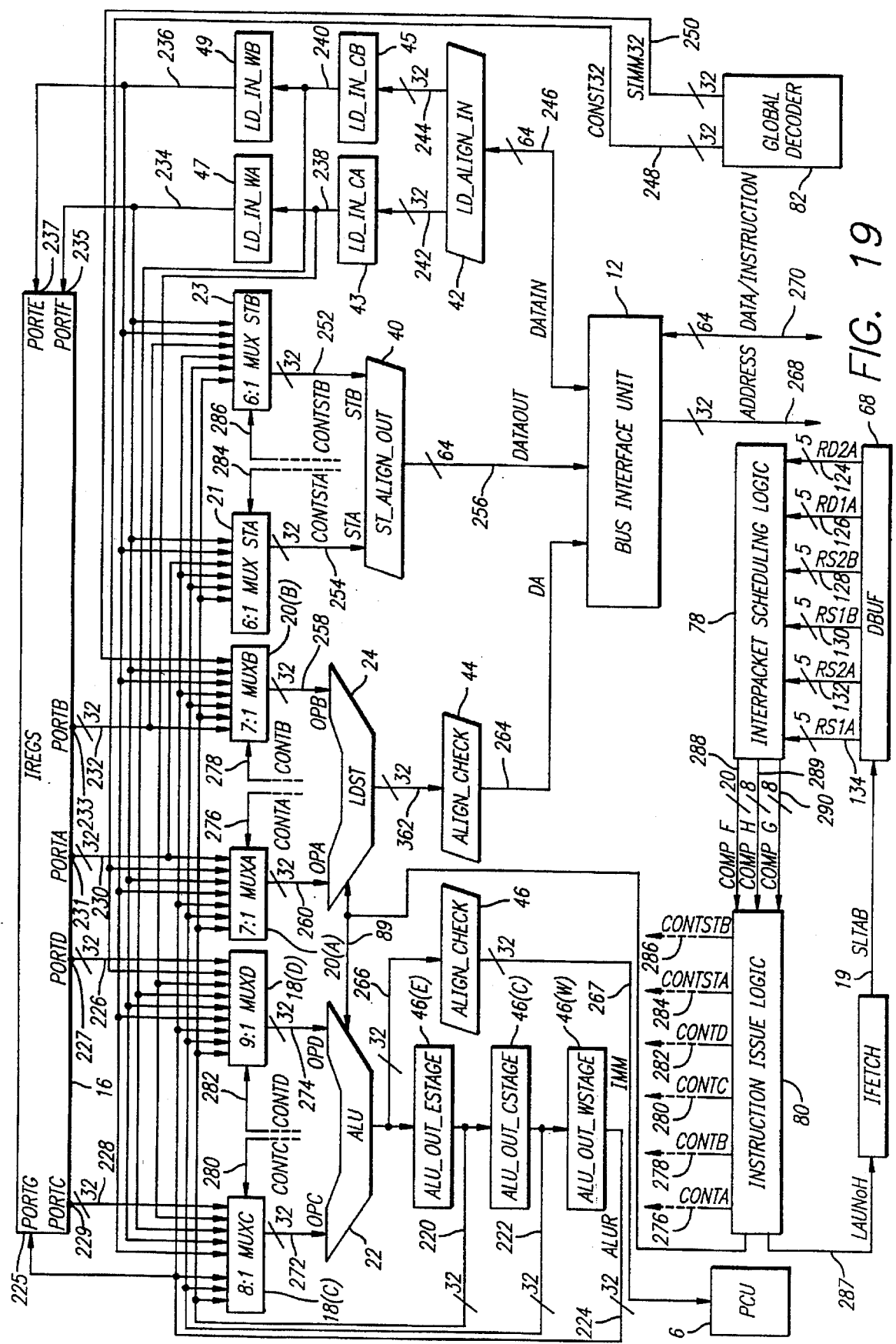
FIG. 19 is a block diagram depicting the Core Data Path of the preferred embodiment of the invention with its associated Dependency Bypass Circuitry.

The IREGS 16 is an overlapping eight-window register file that provides storage for one hundred thirty-six, thirty-two bit registers. A detailed description of IREGS 16 can be found in U.S. patent application Ser. No. 07/615,704, which by this statement is incorporated herein by reference. Referring to FIG. 19, a more detailed diagram of the Core Data Path (1, FIG. 18) is presented. IREGS 16 has three separate write ports. Write Port G 225 is dedicated to receiving the results from ALU 22 over thirty-two bit bus ALUR 224. Write Ports F 235 and E 237 are dedicated to receiving data from external memory on thirty-two bit buses LDWA 234 and LDWB 236 respectively. IREGS 16 supports single and double-word register load formats. Write Port F 235 receives all single-word data operands, and receives the high-order words (i.e. bits thirty-two through sixty-three) of all double-word operands. Write Port E 237 receives the low-order words (i.e. bits zero through thirty-one) of all double-word operands.

IREGS 16 has four separate read ports. Read Port C 229 provides ALU 22 access to operands stored in IREGS 16 over thirty-two bit operand bus 228. Read Port D 227 provides ALU 22 access to operands stored in IREGS 16 over thirty-two bit bus 226. Read Ports A 231 and B 233 provide LDST 24 access to operands stored in IREGS 16 over thirty-two bit buses 230 and 232 respectively. Read Ports A 231 and B 233 also provide ST-ALIGN-OUT 40 with operands stored in IREGS 16 over buses 230 and 232 respectively. Thus, IREGS 16 supports single and double-word register store formats. Read Port A 231 provides all single-word operands for storage in external memory, and provides the high-order operands for all double-word stores. Read Port B 233 provides the low-order operands for all double-word stores.

ALU 22 receives its first operand over thirty-two bit output OpC 272 from eight-to-one vector multiplexer MuxC 18(C). There are eight possible sources for this operand. As previously mentioned, Read Port C 229 of IREGS 16 is one source. The operand can also be provided by latches ALU-Out-Estage 46 (E), ALU-Out-Cstage 46(C) or ALU-Out-Wstage 46(W) on thirty-two bit outputs 220, 222 and 224 respectively. The values on these outputs (if valid) represent the results of ALU instructions currently in the (E), (C) and (W) pipestages of the ALU pipeline respectively.

The first ALU 22 input operand can also be supplied by latches LD-IN-WA 47, LD-IN-WB 49, LD-IN-CA 43 or LD-IN-CB 45 over thirty-two bit outputs 234, 236, 238 and 240 respectively. The values on these outputs (if valid) represent operand data acquired from external memory by load register instructions currently in the (W) and (C) pipestages of the LDST 24 pipeline. The operands in LD-IN-WA 47 and LD-IN-CA 43 latches (if valid) are the result operands of single-word load instructions, or the high-order result operands of double-word load instructions. The operands in LD-IN-WB 49 and LD-IN-CB 45 are the low-order result operands of double-word load instructions.

There are nine possible sources for the second ALU 22 input OpD 274 as provided to the inputs of nine-to-one vector multiplexer MuxD 18(D). One source is Read Port D 227 of IREGS 16. Seven of the sources are identical to those provided to the inputs of MuxC 18(C). E Stage 46(E), C Stage 46(C), W Stage 46(W), WA 47, WB 49, CA 43 and CB 45. One additional source for ALU 22 input OpD 274 is provided to MuxD 18(D); Const32 248 provides a thirty-two bit constant, generated by Global Decoder 82 of CSCHED (2, FIG. 18) during instruction decode for those instructions which specify one. The types of constants and the manner in which they are generated will be presented in greater detail later in the detailed description of Global Decoder 82.

There are seven potential sources for LDST 24 inputs OpA 260 and OpB 258, as provided to seven-to-one vector multiplexers MuxA 20(A) and MuxB 20(B) respectively. Both inputs share five of these potential sources: E Stage 46(E), C Stage 46(C), W Stage 46(W), WA 47 and WB 49. OpA 260 has Read Port A 231 of IREGS 16 as one of its possible sources and OpB 258 has Read Port B 233 as one of its possible sources. Const32 248 from Global Decoder 82 provides the seventh source for OpA 260, while Simm32 250 from Global Decoder 82 provides the seventh source for OpB 258.

Finally, there are six potential sources for St-Align-Out 40 inputs StA 254 and StB 252, as presented on six-to-one vector multiplexers MuxStA 21 and MuxStB 23 respectively. The six thirty-two bit source inputs to MuxStA 21 are identical to the sources input to MuxA 20(A), minus the Const32 248 input from Global Decoder 82. The six thirty-two bit source inputs to MuxStB 23 are identical to those source inputs to MuxB 20(B), minus the simm32 250 input from Global Decoder 82. Operands to be stored in external memory are properly aligned by St-Align-Out 40.

Multiplexer control inputs contC 280, contD 282, contA 276, contB 278, contStA 284 and contStB 286 select which of the potential thirty-two bit source inputs to vector multiplexers MuxC 18(C), MuxD 18(D), MuxA 20(A), MuxB 20(B), MuxStA 21 and MuxStB 23 (respectively) will pass through to the thirty-two bit operand inputs OpC 272, OpD 274, OpA 260, OpB 258, StA 254 and StB 252 (respectively). These control signals are generated by Instruction Issue Logic 80 of CSCHED (2, FIG. 18) during the decode (D) pipestage of each instruction. The control signals are generated in accordance with the results of the instruction decode and scheduling functions performed by CSCHED (2, FIG. 18). The appropriate selections are made before the instruction is launched (issued) into execution (i.e. before the (E) pipestage); the execution units (e.g. ALU 22) must have the operands specified by the instruction before they can begin performing the operation specified by the instruction.

A more detailed description of the Core pipelines will be presented at the end of this section. A more detailed description of the appropriate selection of operand sources during decode will be presented in conjunction with the detailed description of CSCHED (2, FIG. 18).

Referring back to FIG. 18, SREGS 14 is comprised of five special control registers: the processor status register (PSR), the window invalid mask register (WIM), the trap base register (TBR), the Y register and instruction buffer control register (IBCR). The processor status register contains fields which report the status of (and control of) processor operations. The processor status register fields are defined in the Cypress Semiconductor "SPARC RISC User's Guide," except for the following differences: the "impl" field (bits twenty-eight through thirty-one) is fixed at binary 0001, the "vet" field (bits twenty-four through twenty-seven) is fixed at all ones, the "EC" field (bit thirteen) is fixed at zero and "reserve" field (bits fourteen through nineteen) is fixed at all zeros. Writing to these fixed fields is ignored, reading from them always returns their fixed values.

The WIM is defined precisely in the SPARC User's Guide. The TBR contains an address which points to an entry in a trap table. Each trap table entry provides the instructions to calculate the starting address of the trap handing routine appropriate to the type of trap taken. The TBR stores: the base address of the trap table in bits thirteen through thirty-one, an offset to the base address in bits four through twelve (points to the appropriate trap table entry for the type of trap taken) and all zeros in bits zero through three. The table entry address is input to PCU 6 through the thirty-two bit bus TBR 5 when a trap is taken, causing IFETCH 4 to fetch the instruction words from the trap table entry.

The Y register is used to store the high-order word of a sixty-four bit integer multiply result.

The IBCR contains an Instruction Buffer Enable (IBE) at bit zero and a Flush Trap Disable (FTD) at bit one. When set to one, IBE permits accesses of the Instruction Buffer (IBUF) 10 by IFETCH 4; when cleared, IBE disables IBUF 10. When set to one, the FTD bit permits the IBUF 10 to be flushed using a flush instruction; when cleared, an attempt to execute a flush instruction creates a trap.

The Floating-point Data Path (FPDP) 3 is comprised of a Floating-point Register File (FREGS) 26, a Floating-point Arithmetic Unit (FAU) 34, a Floating-point Multiply Unit (FMU) 32 and a Floating-point Queue (FPQ) 38. The FREGS 26 is configured as sixteen, sixty-four bit wide memory words. The memory may be accessed as thirty-two, thirty-two bit registers for storing single-precision operands, or as sixteen double-word register pairs for storing double-precision operands. (Double-precision register pairs are always addressed as adjacent even-odd pairs; they are addressed by the even register of the pair). FREGS 26 has two sixty-four bit write ports. One of the write ports is shared between the sixty-four bit result outputs (41 and 43) of FAU 34 and FMU 32 respectively (through multiplexer 35). The other write port receives floating-point data from memory via load align 42. FREGS 26 has three sixty-four bit read ports. Two read ports are shared between FAU 34 and FMU 32, permitting each functional unit access to two sixty-four operands over sixty-four bit operand outputs FA 55 and FB 57. One read port permits access of operands for storage to external memory through store align 40.

FAU 34 executes SPARC floating-point arithmetic, compare and convert instructions (i.e. fmovs, fabss, fnegs, fadds, fadd, fsubs, fsubd, fitos, fitod, fstoi, fstod, fdtoi, fdtos, fcmps, fcmpd, fcmpes and fcmped). The FAU execution unit consists of three pipestages: Execute one (E1), Execute two (E2) and Round. All instructions executed by FAU 34 have a latency of three clock cycles.

FMU 32 executes SPARC floating-point multiply, divide and square root instructions (i.e. fmuls, fmuld, fsmuld, fdivs, fdivd, fsqrts and fsqrtd). FMU 32, like FAU 34, is comprised of three pipe-stages: (E1), (E2) and Round. Single and double-precision multiplication instructions both execute with latencies of three clock cycles. If a multiplication instruction immediately follows a double-precision multiplication instruction into the floating-point pipeline, however, a one clock cycle delay is introduced because the (E1) pipestage is in use when a double-precision multiplication instruction is in the (E2) pipestage. Iterative algorithms are employed by FMU 32 to execute divide and square root instructions. Thus, additional execution cycles are required to execute them: fdivs requires eleven execution clock cycles; fdivd requires fifteen execution clock cycles; fsqrts requires fourteen execution clock cycles; fsqrtd requires twenty execution clock cycles.

The Floating Point Queue (FPQ) 38 is a buffer consisting of seven queue entries. Each entry is fifty-nine bits wide and can contain a single floating-point instruction which is either in execution (i.e. it is in the "post-queue"), or one that is waiting to execute (i.e. it is in the "pre-queue"). The post-queue of FPQ 38 is comprised of three of the seven total entries. Each entry in the post-queue represents one of the three execution pipestages of the floating-point execution units (i.e. FMU 32 and FAU 34); an instruction advances through the post-queue as it advances through the three execution pipestages. The pre-queue is comprised of the other four entries of FPQ 38. Instructions in pre-queue entries are waiting to execute, either because they are waiting for an execution pipestage to become free, or because they are dependent on the results of a floating-point instruction still executing (i.e. still in a post-queue entry). The pre-queue frees the CSCHED 2 to issue Core instructions ahead of floating-point instructions by stacking up floating-point instructions that must wait for their opportunity to execute. This out-of-order execution is possible because of the decoupled architecture.

Instructions are fetched from memory external to the CPU unless they are already available in IBUF 10. Two thirty-two bit instructions are fetched at a time. These instructions are called packets, with the high-order instruction (i.e. bits thirty-two through sixty-three) known as the SLOTA instruction, and the low-order instruction (i.e. bits zero through thirty-one) known as the SLOTB instruction. The address of the packet is the same as the address for the SLOTA instruction; the SLOTB instruction address is therefore the packet address plus four. Thus, the Program Counter (PC) is incremented by eight for each instruction packet fetch cycle, assuming sequential operation and dual instruction issue.

The Instruction Fetch Unit (IFETCH) 7 issues the appropriate packet address to memory, and stores the returning packet of instructions. The Program Counter Unit (PCU) 6 of IFETCH 7 presents the packet address on thirty-two bit address bus instrA 9 to external memory through Bus Interface Unit (BIU) 12, and to IBUF 10 directly. If the instruction is contained in IBUF 10, the request to external memory is cancelled and the instruction packet is presented to Instruction Fetch Controller (IFETCHC) 4 by IBUF 10 over sixty-four bit bus Ipack 13. Otherwise the instruction packet is imported from external memory through BIU 12 and presented to both IBUF 10 and IFETCH 4 over sixty-four bit bus instrE 15.

The PCU 6 performs three primary functions: first, it selects from a number of potential sources, the address for the next instruction to be fetched for execution; it then presents that address on thirty-two bit bus instrA 9; second, it evaluates condition codes for making conditional branch decisions; and third, it keeps track of the program counter (PC) addresses for each packet of instructions as it moves through successive stages of the pipeline. This is particularly important for saving the state of the machine in case of interrupts or traps.

PCU 6 has six possible choices for the next instruction packet address to be presented on instrA 9. PCU 6 will select: the constant zero if a CPU reset is asserted, the trap table entry address on TBR 5 if a trap is taken, the next sequential packet address (i.e. previous address plus eight) if sequential operation is intact, the address on IMM 267 which is calculated by ALU 22 in executing a jmpl, rett, or flush instruction, the target address calculated by PCU 6 itself in executing a branch instruction (if the branch is to be taken, i.e. the condition codes evaluate true), or it will choose a special temporary PC maintained in the case where a Fast Branch is executed but not taken, and the original instruction stream must be restored.

PCU 6 executes SPARC integer and floating-point branch and call instructions (i.e. bicc, fbfcc and call). It executes these instructions by adding the address of the branch or call instruction currently in the decode pipestage (D), to the immediate constant as specified in the immediate displacement field of that instruction, to generate the branch target. The immediate constant is presented to PCU 6 on disp 17 from CSCHED 2. If the branch or call instruction executed by the PCU 6 is in SLOTA, then the address used to calculate the target is the packet address. If the branch or call instruction is in SLOTB, the address used to calculate the target is the packet address plus four.

IFETCH 4 receives instruction packets fetched from IBUF 10 or external memory and stores them in its internal buffers. IFETCH 4 has two sets of internal instruction buffers (not shown). DBUF is a set of two thirty-two bit buffers which holds the instructions of a fetched packet. DBUF presents the two thirty-two bit instructions to the Core Instruction Scheduler (CSCHED) 2 on sixty-four bit bus SLTAB 19. As instructions are launched, the valid bits corresponding to each vacated slot in the DBUF buffers are cleared. A second set of thirty-two bit buffers (called FBUF) is loaded with fetched instructions if DBUF is not empty (e.g. at least one of the instructions in DBUF was not launched). If both buffers are full, no further instruction fetch requests are generated.

Instructions issued from DBUF are replaced by any valid instructions in FBUF. A SLOTB instruction may not issue ahead of a valid SLOTA instruction (i.e. out-of-order). Thus, only a SLOTA instruction may issue singularly. The instruction fill procedure in such a case will shift the SLOTB instruction in DBUF to SLOTA (in place of the instruction just launched singularly), a valid instruction in SLOTA of FBUF will fill SLOTB in DBUF, a valid instruction in SLOTB of FBUF will shift to SLOTA of FBUF. Thus, the instructions fill in the vacated buffers to maintain in-order execution. Instructions can be cancelled and thereby prevented from issuing if the buffer valid bits are cleared. Cancelled instructions are replaced in the same manner as though they had launched.

Instruction Buffer (IBUF) 10 is a two-way set associative buffer containing one hundred twenty-eight line entries. Each entry can store four instruction packets (eight instructions). Two thousand forty-eight instructions can be held in the buffer. The purpose of the IBUF 10 is to reduce contention for external memory between the IFETCH 7 and Load/Store pipeline. If an instruction fetch is initiated and a load or store instruction is in its cache (C) pipestage, the IFETCH pipestage must wait to perform its memory access until the Load or Store is finished. This contention can be eliminated if the fetch can obtain its instruction from IBUF 10. PCU 6 always sends its address to both IBUF 10 and BIU 12 in parallel. Thus, if the instruction is not found in IBUF 10, a request from external memory is already in progress.

Bus Interface Unit (BIU) 12 provides the interface communications link between the CPU and external memory.

BIU 12 coordinates and generates appropriate signals for CPU accesses of external memory and the transfer of data and instructions between them. BIU 12 insures that appropriate timing constraints are observed for proper data transfer.

The Core Instruction Scheduler (CSCHED) 2 implements the method by which the preferred embodiment of the invention is capable of issuing (or launching) up to three instructions simultaneously. It decodes the two instructions presented to it on SLTAB 19 by DBUF of IFETCHC 4, and ascertains whether they can be issued simultaneously. It then detects any data dependencies or interlocks. It then determines when those dependencies or interlocks detected can be resolved, scheduling the instructions for issue accordingly. If any dependencies exist which must be resolved to permit launch as scheduled, CSCHED 2 resolves these dependencies by activating the appropriate path through the data forwarding circuitry. If interlocks are detected, CSCHED 2 holds up instruction launch until they can be resolved.

Floating-point instructions are routed (i.e. dispatched) by CSCHED 2 to FPQ 38. Floating-point instructions are scheduled for execution by Floating-point Scheduler (FPSCHED) 36. FPSCHED 36 performs roughly the same duties as CSCHED 2, except that multiple floating-point instructions are issued singularly in the preferred embodiment. The preferred embodiment can be easily extended, however, using the method implemented by CSCHED 2, to permit FPSCHED 36 to issue two floating-point instructions simultaneously.

CSCHED 2 and FPSCHED 36, although primarily operating asynchronously from one another, do communicate. FPSCHED 36 instructs CSCHED 2 to suspend issuing additional floating-point instructions if FPQ 38 is full. It also notifies CSCHED 2 if a floating-point load or store is dependent on any of the floating-point instructions in FPQ 38. If such a dependency exists, CSCHED 2 must not issue the dependent floating-point load or store instruction until the dependency has been resolved.

Figure 20:
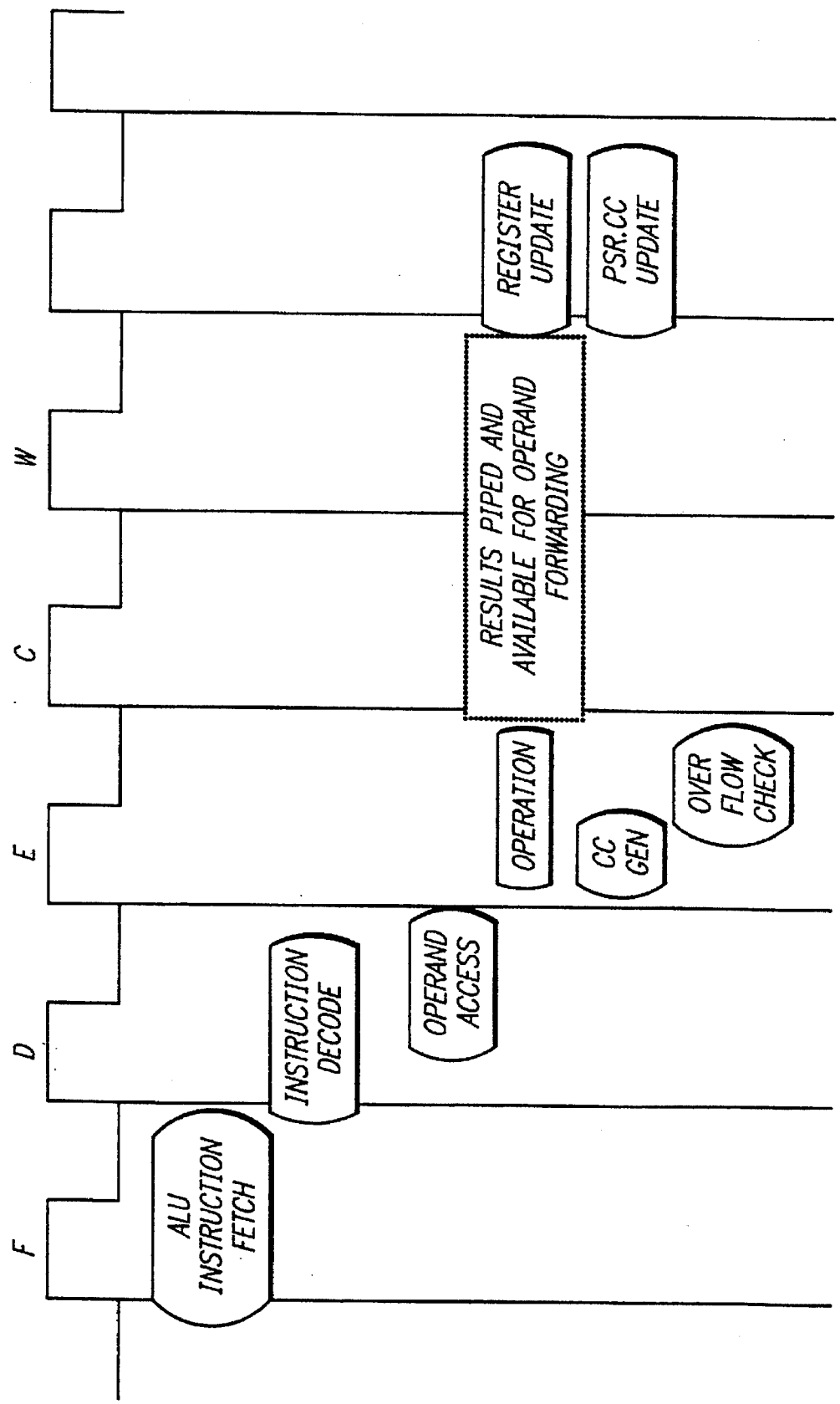
FIG. 20 is a sequential diagram of the typical ALU instruction pipeline.

With reference to FIG. 19, a more detailed description of the Core pipelines is now presented. FIG. 20 illustrates the typical ALU instruction pipeline for the preferred embodiment. During the (F) pipestage, the instruction is fetched from either IBUF (10, FIG. 18) or external memory by IFETCH (7, FIG. 18) as previously described. The instruction is stored in DBUF 68 of IFETCHC (4, FIG. 18) and is presented to CSCHED (2, FIG. 18) on SLTAB (19, FIG. 18) during the (D) pipestage. The instruction is characterized and scheduled by CSCHED (2, FIG. 18), and decoded by the local decode logic associated with the ALU 22. Based on the results of the decoding and scheduling functions performed by CSCHED (2, FIG. 18), vector multiplexer control signals contC 280 and contD 282 are configured by Instruction Issue Logic 80 to connect the appropriate MuxC 18(C) and MuxD 18(D) input sources to ALU operand inputs OpC 272 and OpD 274 respectively. This process is called operand access.

If the instruction was scheduled to issue by CSCHED (2, FIG. 18), it enters the (E) stage of the pipeline where the ALU 22 performs the operation specified by the instruction on the operands that were selected to pass through MuxC 18(C) and MuxD 18(D). The result of the operation appears on Result Bus 266 just prior to the end of the (E) pipestage. The thirty-two bit result is then latched into ALU-Out-Estage 46(E), from which it is made available (if necessary) to a dependent instruction currently in the (D) pipestage. Also generated during the (E) pipestage are condition codes for branch condition evaluation.

When entering the (C) pipestage, the result is simply latched into ALU-Out-Cstage 46(C), where it is again made available on Bus 222 to any dependent instructions: those instructions in (D) that specified the same register as a source for one of their operands as the ALU instruction currently in the Cache pipestage specified as the destination of its result. Upon entering the (W) pipestage, the operational result of the instruction is latched into the ALU-Out-Wstage 46(W). The thirty-two bit value is made available on Bus 224 to all of the execution unit input multiplexers, as well as the Write Port G 225 of IREGS 16. On the next rising edge of the CPU clock (i.e. at the end of (W)), the thirty-two bit word is stored into that memory location of IREGS 16 assigned to provide physical storage for the destination register specified in the ALU instruction which generated the results.

If the ALU instruction is of the type that sets condition codes, they are set during the (E) pipestage. They are not, however, written into the Processor Status Register until the end of the (W) pipestage. Thus, the condition code generated by the instruction is latched for the (E), (C) and (W) pipestages just as the operational result is. Thus, the condition codes can be forwarded to branch instructions in (D), just as the operational results are forwarded to instructions during operand access in (D). When executing jmpl and rett instructions, ALIGNMENT CHECK (FIG. 18, 46) verifies that the address generated by the ALU is aligned on a word boundary.

Figure 21:
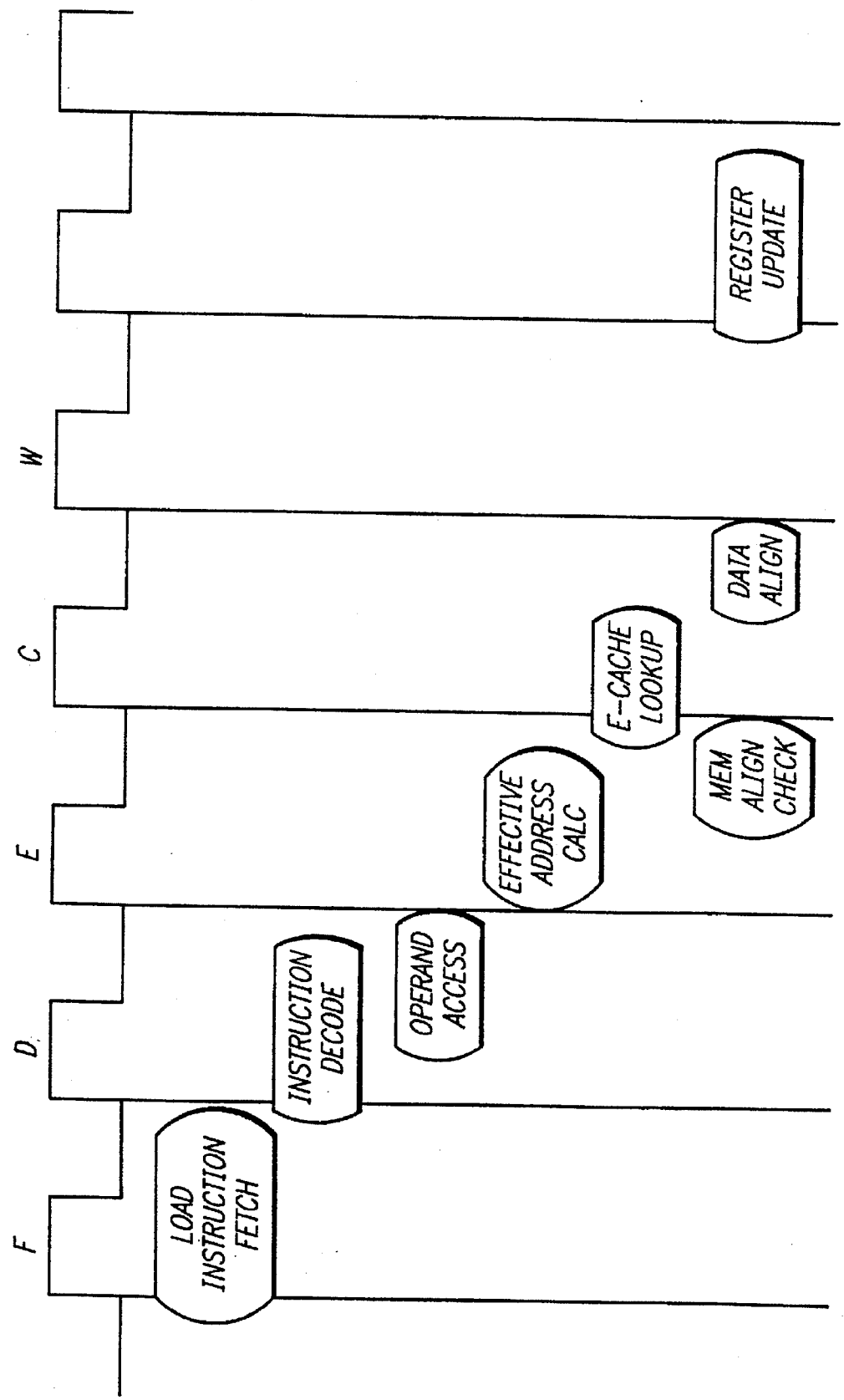
FIG. 21 is a sequential diagram of the typical LOAD instruction pipeline.

FIG. 21 illustrates the typical load instruction pipeline for the preferred embodiment. The load instruction (F) pipestage is the same as for the ALU instruction previously described. Instruction decode and operand access are virtually the same as well. The only difference is that the operands for the load instruction are accessed through MuxA 20(A) and MuxB 20(B). Multiplexer control signals contA 276 and contB 278 are configured by Instruction Issue Logic 80 to select the appropriate sources for each LDST 24 input according to the results of the scheduling and decoding functions also performed during (D).

During the (E) pipestage (the instruction was issued by CSCHED 2, FIG. 18), LDST 24 uses the operand values selected by MuxA 20(A) and MuxB 20(B) to calculate the effective address of the external memory location from which data is to be retrieved. Align-Check 46 insures that the address value is appropriate for the data size to be retrieved (i.e. double-word, word, byte, etc.). The address is input to BIU 12 on thirty-two bit bus DA 264. Assuming the memory is available, BIU 12 passes the address to the external memory on AB 268.

During the (C) pipestage, the data from memory is presented by the external memory on DIB 270 to BIU 12. BIU 12 then passes the data word onto sixty-four bit bus Data In 246, which presents the data word to LD-Align-In 42. If the load instruction specified a single data word format, the data is passed through LD-Align-In 42 onto thirty-two bit Bus 242. If the instruction specified a double data word format, the high-order word appears on Bus 242, and the low-order word appears on Bus 244. The data is then latched into LD-IN-CA 43 and LD-IN-CB 45. Thirty-two bit latch outputs 238 and 240 provide the data words to the input multiplexers (i.e. MuxC 18(C) and MuxD 18(D)) of ALU 22. Thus, if an ALU instruction is in its (D) pipestage and requires this data to issue, CSCHED (2, FIG. 18) will configure control signals contC 280 and contD 282 to connect Buses 238 and 240 to OpC 272 and OpD 274 respectively. Buses 238 and 240 are not input to either the LDST 24 or ST-Align-Out 40 input multiplexers because the results are not stored in latches LD-IN-CA 43 or LD-IN-CB 45 soon enough to be accessed by them properly; the LDST 24 and ST-Align-Out 40 units need the data at their inputs sooner than does the ALU 22.

During the (W) pipestage, the data words are latched into LD-IN-WA 47 and LD-IN-WB 49, and their values appear on Buses 234 and 236. The data words are now available to all of the execution units in case an instruction dependent on the data is in its (D) pipestage. Buses 234 and 236 also present the data words to Write Port F 235 and E 237 respectively. At the end of the (W) pipestage, the data word or words are written into the register on registers specified as the destination for the load instruction.

Figure 22:
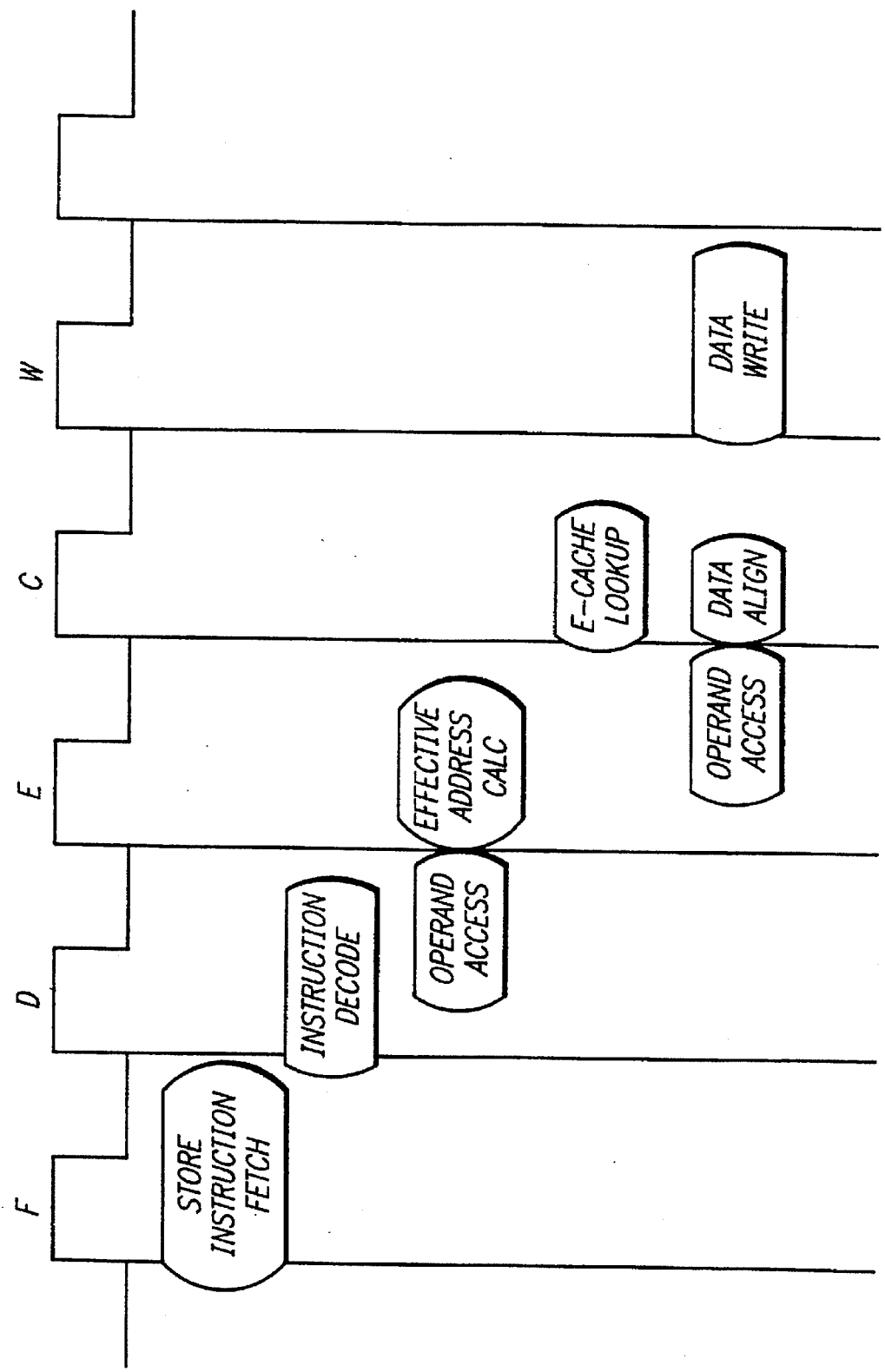
FIG. 22 is a sequential diagram of the typical STORE instruction pipeline.

FIG. 22 illustrates the typical store instruction pipeline for the preferred embodiment. The (F) and (D) pipestages are identical to the load instruction pipeline just described. In the (E) pipestage, the LDST 24 calculates an effective memory address which is aligned by Align-Check 46 and presented to external memory through BIU 12 on AB. The store instruction differs in that it is using the effective address to access memory to store data into external memory; thus it requires a third source operand access. The third operand, the data to be stored in external memory, can be in either single-word or double-word format and is supplied through St-Align-Out 40. Because the input multiplexers of St-Align-Out 40 (i.e. MuxSta 21 and MuxStb 23) share all of their operand sources with the LDST 24 input multiplexers MuxA 20(A) and MuxB 20(B), the St-Align-Out cannot access its operands during (D); LDST 24 accesses its operands for effective address calculation during (D). Thus, a second operand access must take place for the store data operand during the (E) pipestage.

During the (C) pipestage, the data word to be stored in memory is presented to external memory on sixty-four bit bus Data Out 256, which pass through BIU 12 to the write port of the external memory on DIB50. If the data word is in single-word format, the word comes from MuxStA 21 output StA 254, and is duplicated by St-Align-Out 40 to appear on bits zero through thirty-one and bits thirty-two through sixty-three of Data Out 256. If the data word is in double-word format, the high-order word comes from StA 254 and the low-order word comes from StB 252.

The data word is stored into the external memory sometime during the (W) pipestage.

Figure 23:
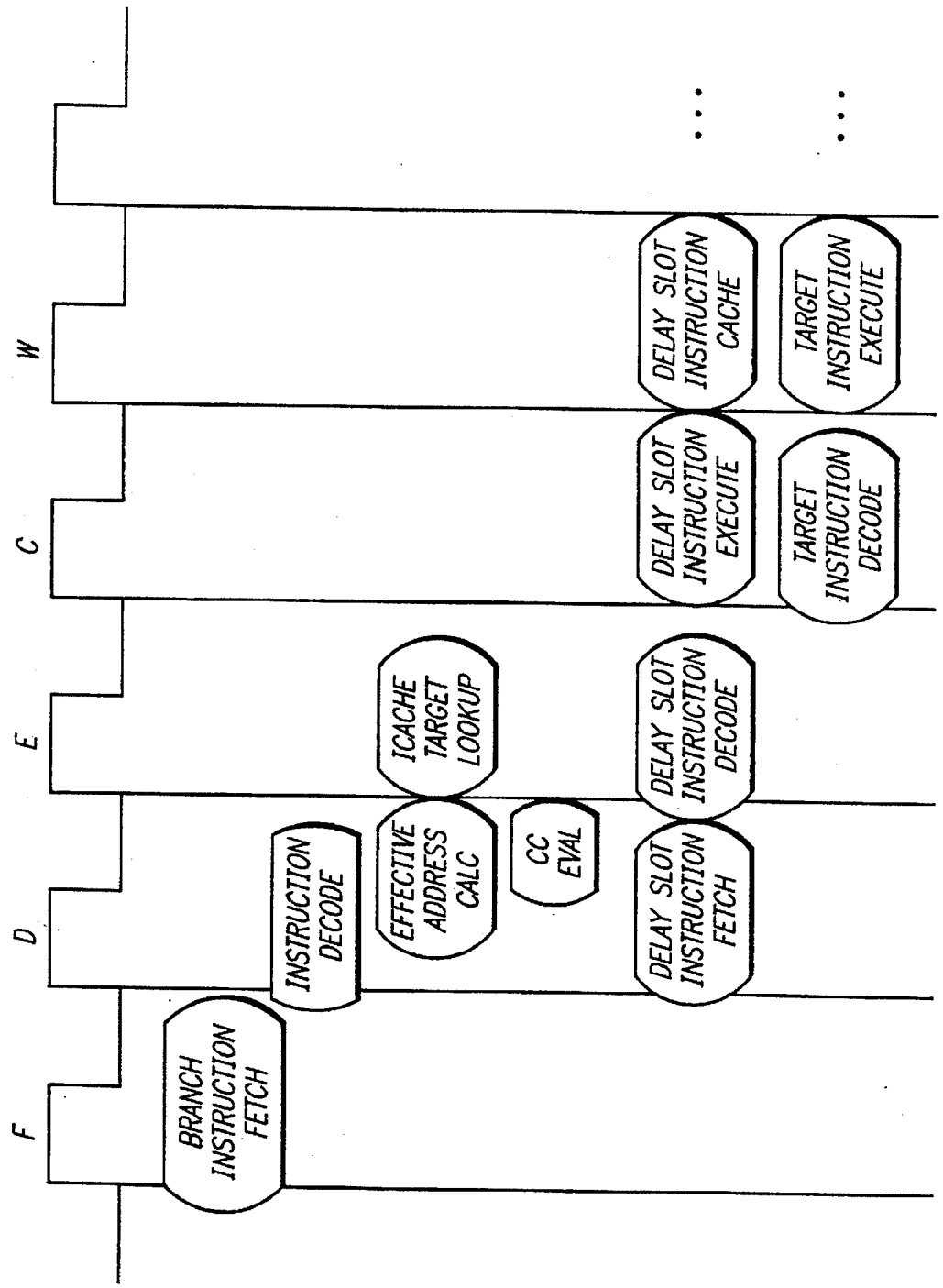
FIG. 23 is a sequential diagram of the typical Branch instruction pipeline.

FIG. 23 illustrates the typical branch instruction pipeline. The branch performs no computational activities during either the (C) or (W) pipestage. The program counter (PC) value for the branch instruction is, however, maintained through the (C) and (W) pipestages by PCU 6. The (F) pipestage is identical to the ALU, load and store pipelines. As previously discussed, the branch is decoded and executed during the (D) pipestage. The PCU (6, FIG. 18) calculates the effective address of the target using the address of the branch instruction itself and the offset value specified in the imm22 bit field of the instruction. For call instructions, the PCU calculates the effective address of the target instruction using the address of the call instruction itself and the offset value specified in the imm30 bit field of the instruction. The condition codes are evaluated by the PCU (6, FIG. 19) and the delay slot instruction fetch is also initiated during (D). During the (E) pipestage, the target instruction is fetched if the branch is to be taken, otherwise the next sequential instruction after the dsi is fetched.

1. Core Instruction Scheduler

Figure 24:
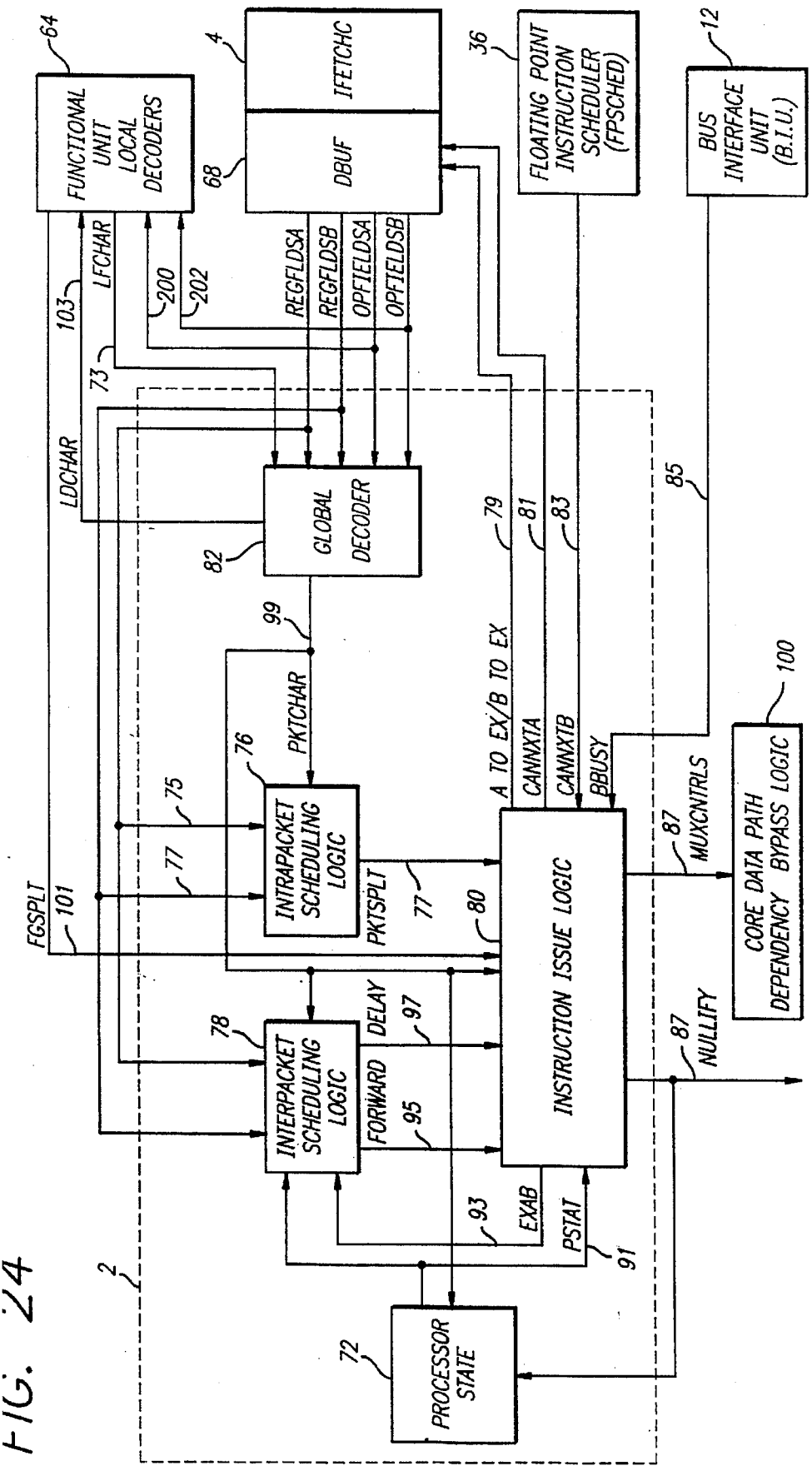
FIG. 24 is a block-level diagram of Core Instruction Scheduler.

Referring to FIG. 24, a block-level representation of CSCHED 2 is depicted. CSCHED 2 is comprised of five major blocks: Global Decoder 82, Intrapacket Scheduling Logic 76, Interpacket Scheduling Logic 78, Processor State 72 and Instruction Issue Logic 80.

CSCHED 2 decodes and schedules the instructions currently occupying DBUF 68 for launch; instructions currently in DBUF 68 are in the (D) pipestage of their respective pipelines. CSCHED 2 also controls operand access for the instructions in DBUF 68 in accordance with the results of its scheduling activities. CSCHED 2 performs these tasks in parallel so that they will be completed within one CPU clock cycle. Instruction decode is the process by which the functional unit(s) (i.e. PCU 6, ALU 22, LDST 24 or FPDP 3, FIG. 18) assigned to execute the instruction(s) in DBUF 68 are identified and then appropriately configured to perform the operation specified in the encoded instruction. Instruction scheduling is the process by which CSCHED 2 determines whether the instructions in DBUF 68 will be permitted to launch into execution (i.e. move from their (D) to their (E) pipestage) on the next rising edge of the CPU clock. Operand access is the process by which CSCHED 2 determines from which of many possible sources the operands, upon which the functional units will operate during the execution (E) pipestage, are to be obtained. The selected source for each operand is a direct result of the scheduling process.

There are three primary tasks involved in the scheduling process. First, CSCHED 2 must determine whether sufficient resources exist to execute both instructions during the next CPU clock cycle. Second, CSCHED 2 must determine whether there are data dependencies between the two instructions in DBUF 68; such dependencies are called intrapacket dependencies. Finally, CSCHED 2 must determine whether any data dependencies exist between either one (or both) of the instructions in DBUF 68, and those instructions still executing in the various pipelines. Dependencies between the instructions currently in DBUF 68 and those currently in pipestages other than (D) are known as interpacket data dependencies. Each of these scheduling tasks are performed by a separate block of circuitry so that they may be accomplished in parallel. Resource availability is determined by Global Decoder 82 and data dependencies between the instructions in DBUF 68 are detected by Intrapacket Scheduling Logic 76. Data dependencies between the instructions in DBUF 68 and those currently ahead of them in the various pipelines are detected by Interpacket Scheduling Logic 78.

Operand access is a function of the existence or not of interpacket dependencies. If there are no interpacket dependencies, the appropriate functional unit input multiplexers (i.e. MuxC 18(C), MuxD 18(D), MuxA 20(A), MuxB 20(B), MuxStA 21 or MuxStB 23) are directed by CSCHED 2 to select their inputs which emanate from IREGS 16; operands are accessed from the register file. If an interpacket dependency exists, and the result upon which the instruction in DBUF 68 depends has been generated, CSCHED 2 will direct the appropriate functional unit input multiplexer to select its thirty-two bit input emanating from the pipestage occupied by the instruction which generated the result. CSCHED 2 controls the input multiplexers during operand access through their associated control inputs contC 280, contD 282, contA 276, contB 278, contStA 284 and contStB 286, FIG. 19.

The scheduling process performed by CSCHED 2 is dependent on the instruction decode process; the scheduling function requires some information about the character of the instructions being scheduled. To facilitate the performance of these tasks in parallel, the instruction decode process is performed hierarchically. Initially, a high level of characterization is performed on the instructions in DBUF 68, reaching a level of specificity just necessary to support the scheduling functions. This high-level characterization, called global decode, is performed by the Global Decoder 82 in FIG. 24. This instruction characterization data is made available to the blocks which perform the scheduling functions (i.e. Intrapacket Scheduling Logic 76, Interpacket Scheduling Logic 78, Processor State 72 and Instruction Issue Logic 80) over PktChar 99.

This characterization data is also provided to decode circuitry locally associated with each functional unit (i.e. Functional Unit Local Decoders 64) over LDChar 103. Local Decoders 64 complete the instruction decode process by appropriately configuring those execution units required to execute the instructions once they are issued. Thus, the instruction scheduling process can be performed in parallel with the bulk of the instruction decode process.

Global Decoder 82 receives the register bit fields and opcode information from the two instructions currently awaiting launch scheduling in DBUF 68 (of IFETCHC 4, FIG. 18). The bit fields in the SLOTA instruction specifying source and destination register addresses are presented to Global Decoder 82 on bit-field input RegFldsA 75. Source and destination register addresses specified in SLOTB are input to Global Decoder 82 on bit-field input RegFldsB 77. Likewise, bit-fields specifying opcodes for the SLOTA and B instructions are input to Global Decoder 82 on bit-field inputs OPFIELDSA 200 and OPFIELDSB 202 respectively.

Global Decoder 82 globally decodes the instructions and passes the resulting instruction characterization information to the other four CSCHED blocks (i.e. Intrapacket Scheduling Logic 76, Interpacket Scheduling Logic 78, Processor State 72 and Instruction Issue Logic 80) on bus PktChar 99. The other four blocks use this information to perform their individual instruction scheduling functions. Global Decoder 82 also passes its instruction characterization information over bit-field output LDChar 103 to Core Unit Local Decoders 64. The local decode logic for each execution unit (i.e. ALU 22, LDST 24 and PCU 6, FIG. 18) further characterizes the instruction bit-field information to appropriately configure its associated execution unit to execute the instruction. The local decode logic inputs some of this lower-level instruction characterization back to Global Decoder 82 over LFChar 73. This lower-level characterization is used to support instruction scheduling. A more detailed description of the operation of Global Decoder 82 will be presented later.

Intrapacket Scheduling Logic 76 also receives register bit-fields from the instructions currently awaiting launch scheduling in DBUF 68. The bit fields specifying source and destination registers in the SLOTA and SLOTB instructions are input to Intrapacket Scheduling Logic 76 on RegFldsA 75 and RegFldsB 77 respectively. Instruction packet characterization information generated by Global Decoder 82 is input to Intrapacket Scheduling Logic 76 on PktChar 99. Intrapacket Scheduling Logic 76 uses the above information to determine whether any data dependencies exist between the two instructions currently in DBUF 68 that would preclude them from issuing (i.e. launching) concurrently. If such dependencies exist, the Intrapacket Scheduling Logic 76 notifies the Instruction Issue Logic 80 by forcing output PktSplt 77 to an active true state. A true state on PktSplt 77 notifies Instruction Issue Logic 80 to schedule the SLOTA instruction to launch at least one clock cycle ahead of the SLOTB instruction (i.e. the packet is split). A more detailed description of Intrapacket Scheduling Logic 76 will be presented later.

Interpacket Scheduling Logic 78 receives the identical register address and instruction information (i.e. RegFldsA 75, RegFldsB 77 and PktChar 99) as Intrapacket Scheduling Logic 76. Interpacket Scheduling Logic 78 also receives information from Instruction Issue Logic 80 on input ExAB 93. ExAB 93 indicates whether either or both of the instructions in DBUF 68 during the previous clock cycle were valid and launched into execution at the onset of the current clock cycle. Finally, Interpacket Scheduling Logic 78 receives information from Processor State 72 on input Pstat 91, which provides information regarding the nature of the instructions validly launched and occupying each stage of the ALU (22, FIG. 18) and LDST (24, FIG. 18) pipelines.

The Interpacket Scheduling Logic 78 uses the above information to detect data dependencies and pipeline interlocks arising between either of the two instructions comprising the packet currently awaiting launch scheduling in DBUF 68, and those instructions currently executing in the various pipestages of both the ALU (22, FIG. 19) and LDST (24, FIG. 19) pipelines. Interpacket Scheduling Logic 78 notifies Instruction Issue Logic 80, by way of output bus Forward 95, of the data forwarding path which must be used to bypass a detected data dependency and thereby permit the scheduling of the dependent instruction for immediate launch (i.e. on the next rising edge of the CPU Clock). Interpacket Scheduling Logic 78 also notifies Instruction Issue Logic 80, by way of output Delay 97, of any data dependencies which cannot be bypassed (i.e. interlocks) and which therefore require the dependent instructions to be delayed from launching until the dependency is capable of being bypassed.

Processor State 72 is a series of latches which correspond to the pipestages of the CDP (1, FIG. 18). These latches contain information which characterizes the type of instruction currently executing in each of the pipestages, and is updated every CPU clock cycle to reflect the movement of the instructions through the pipelines. This information is presented to Interpacket Scheduling Logic 78 and Instruction Issue Logic 80 on output bus PStat 91. Instruction Issue Logic 80 provides Processor State 72 with information regarding when instructions are actually issued. The current state of the pipeline becomes important for the scheduling of certain instructions in light of those instructions already in the pipeline. These situations will be made apparent in the more detailed discussions of the two blocks which use the information.

The function of Instruction Issue Logic 80 is to process the information generated by Processor State 72, Interpacket Scheduling Logic 78, Intrapacket Scheduling Logic 76 and Global Decoder 82 of CSCHED 2, along with information from FPSCHED 36 and BIU 12, to effect the launching of instructions into execution as scheduled. Instruction Issue Logic 80 generates four major classes of outputs: execution unit nullify signals 89, SLOTA to execute/SLOTB to execute (AtoEx/BtoEX) 79 and EXAB 93, Cancel Next A/Cancel Next B (i.e. CanNxtA/CanNxtB) 81 and MuxCntrls 87.

The nullify signals 89 are input to the three Core Data Path execution units (i.e. ALU 22, LDST 24 and PCU 6). When one of these signals is asserted true, its associated execution unit is disabled so that it cannot execute an instruction. They are typically asserted either when there is no instruction currently in DBUF 68 which requires that particular execution unit, or when there is an instruction currently in DBUF 68 which normally requires that particular execution unit but which is either being delayed from launching or cancelled.

The AtoEx/BtoEx 79 and CanNxtA/CanNxtB 81 signals provide information to IFETCHC 4 necessary to control the loading of its DBUF 68 and FBUF buffers (not shown) with fetched instructions. When AtoEx is asserted true, it notifies IFETCHC 4 that SLOTA in DBUF 68 (i.e. DBUFA) is free to receive another instruction. Likewise, when BtoEx is asserted true, SLOTB in DBUF68 (i.e. DBUFB) is free to receive the next instruction. The CanNxtA/CanNxtB signals 81, when asserted true, notify IFETCHC 4 that the next instruction entering SLOTA/SLOTB must be cancelled.

The MuxCntrls signals 87 provide information to control the multiplexers (i.e. 18(C), 18(D), 20(A), 20(B), 21 and 23, FIG. 19) of the Core Data Path Dependency Bypass Logic 100 (shown in detail in FIG. 19). These control signals cause the multiplexers to select the appropriate forwarding path by which input operands can be obtained for the execution units, bypassing data dependencies detected by Interpacket Scheduler 78. The MuxCntrls signals 87 are generated from the Forward signals 95 provided by the Interpacket Scheduler 78.

a. Global Decoder

A more detailed description of the Global Decoder 82 is now presented. As previously discussed, Global Decoder 82 performs two primary functions. First, it performs a high-level of characterization (i.e. global decode) on the instructions currently awaiting launch scheduling in DBUF 68. Second, it performs two special, hardwired execution functions which permit the simultaneous issue of some commonly occurring instruction combinations that would not otherwise be possible.

Neither the instruction scheduling nor instruction decode functions can proceed until the global decode is complete. Thus, it is imperative that the process be as fast and efficient as possible. The global decode is essentially a group classification of the instruction set. The first level of classification splits the CPU instruction set into two major groups: those instructions that must issue singularly (i.e. Group F instructions), and those instructions that are capable of being launched simultaneously (i.e. all of the remaining instructions).

Group F instructions are those that cause the CPU to abruptly leave the current instruction stream or begin execution in a completely different mode. Instructions are also classified as Group F if there is a probability that their execution will cause an exception; exceptions cause traps to be taken which invoke trap handling routines.

The restoration of the original instruction stream is made much more complicated if an instruction issues simultaneously with an instruction causing an exception. The added complexity necessary to handle such a situation would only further impinge on performance and increase costs associated with enlarged die area. The preferred embodiment does not implement the necessary resources to handle issuing Group F instructions in parallel as an engineering cost/performance decision. Examples of instructions which should be classified as Group F are: privileged instructions, control/status register access instructions, tagged with trap on Overflow, subroutine call instructions, trap instructions, coprocessor instructions and unimplemented instructions.

The remaining (i.e. non-F group instructions) are subclassified according to the particular execution resources necessary to execute them. Thus, Group A instructions are those that require the LDST (24, FIG. 19) Unit as their execution resource. Group B instructions utilize the ALU (22, FIG. 19). Group C instructions require either FAU (34, FIG. 18) or FMU (32, FIG. 18) to execute. Group E instructions use PCU (6, FIG. 18). Finally, Group D is reserved for instructions requiring FMU (32, FIG. 18) in a future embodiment of the invention in which parallel execution of floating-point instructions is implemented. The table of FIG. 32 lists the instruction grouping as applied to the SPARC instruction set for the preferred embodiment. This method of resource classification can be extended to any instruction architecture.

Global Decoder 82 performs this group classification with the least number of instruction word bits possible. FIG. 25 illustrates the five basic instruction formats used by the SPARC instruction architecture. The preferred embodiment as applied to the SPARC instruction architecture can ascertain an instruction's group by examining only nine bits of the instruction word: bits thirty through thirty-one, bits nineteen through twenty-four and bit thirteen. These bits correspond to the OPFIELDSA 200 and OPFIELDSB 202 bit-field outputs from DBUF 68.

Using only nine bits to classify instructions in this manner, two important instruction scheduling decisions can be made almost immediately. First, if either instruction (or both) currently in DBUF 68 (i.e. in pipestage (D)) is classified as belonging to Group F, Instruction Issue Logic 80 schedules the instructions to issue sequentially (i.e. splits the packet). Instruction Issue Logic 80 splits the packet because it receives the characterization information from Global Decoder 82 over PktChar 99. It should be noted that a few of these split packet decisions must wait for some additional instruction decode information, provided to Instruction Issue Logic 80 by the Local Decoder 64 over FgSplt 101. The Local Decoder 64, associated with ALU 22, supplies such information for the following instructions: save, restore, rdpsr, rdwim, rdy, rdtbr, rdasr, tsubcctv, cpop and illegal. The local decoder 64 associated with LDST 24 provides such information for the following instructions: lda, sta, ldda, stda, lduba, ldsba, lduha, ldsha, stba, stha, ldstuba, swapa, ldc, lddc, ldcsr, stc, stdc, stcsr, stdcq, stdfq and illegal.

If the Group F instruction is currently in SLOTA, Instruction Issue Logic 80 tentatively schedules it to issue singularly on the next rising edge of the CPU clock; the instruction in SLOTB is scheduled to issue one clock cycle after the Group F instruction currently in SLOTA (i.e. the SLOTB instruction is delayed). If the Group F instruction is in SLOTB, Instruction Issue Logic 80 tentatively schedules the SLOTA instruction to issue on the next rising edge of the CPU clock; the Group F instruction in SLOTB is scheduled to issue one clock cycle after the SLOTA instruction.

It should be noted that when a packet of instructions is split as described above, the one clock cycle separation introduced between them is maintained regardless of any further delays in launching the SLOTA instruction. If the SLOTA instruction in the above examples was found to be dependent on an instruction already in execution in the pipeline and the dependency could not be bypassed (i.e. an interlock), the SLOTA instruction would have to wait one clock cycle to launch; therefore the SLOTB instruction would have to wait two clock cycles. The preferred embodiment maintains in-order execution, so no matter how long the SLOTA instruction is delayed the SLOTB instruction will always launch at least one clock cycle after the SLOTA instruction. Further, once the SLOTA instruction launches, the delayed SLOTB instruction moves into the vacant SLOTA, while a new instruction fills the SLOTB. The scheduling process is then performed on this new combination of instructions, the instruction in SLOTA having been held over from the cycle before.

A second scheduling issue can be resolved from this very fast group scheduling method. Any structural hazards occurring between the instructions comprising the packet in DBUF 68 are inherently detected. If both instructions belong to the other groups capable of being issued simultaneously (i.e. Groups A, B, C or E), but belong to the same group classification (i.e. require the same execution resource), they cannot be issued simultaneously; there exists insufficient resources to launch both instructions simultaneously. Thus, if two Group B instructions (i.e. an add and an xor) occupy SLOTS A and B, Instruction Issue Logic 80 again splits the packet in the manner previously described for Group F instructions. A special exception to the general rule requiring a packet split for instructions requiring the same execution unit occurs in the case where two instructions are paired to create a constant. This special feature, known as Fast Constant, will be described in more detail shortly. It should be pointed out that this method of scheduling may be easily adapted to an embodiment with duplicative resources.

Another advantage of the group classification performed by Global Decoder 82 is that the appropriate execution unit for each instruction currently in DBUF 68 has now been identified for purposes of completing instruction decode. With the class of both instructions now identified, the more detailed level of decoding necessary to properly configure the appropriate functional unit can be accomplished by enabling that functional unit's associated local decoder. Only eight bits (i.e. bits nineteen through twenty-four and bits thirty through thirty-one) are required to complete instruction decode at the local decoder level for the CDP (1, FIG. 18). FIG. 26 illustrates the local decode process for the functional units of CDP (1, FIG. 18). The result of the local decode process is not only used to configure the execution unit to perform the particular operation specified by the instruction, but it is also fed back to Global Decoder 82 on LFChar 73 to further support the instruction scheduling process. The local decode process for floating-point instructions is similar, and will be discussed in more detail in conjunction with the FPDP (3, FIG. 18).

Thus, the two-level instruction decode process implemented by the Global Decoder 82 of the preferred embodiment facilitates the completion of instruction decode and scheduling within the same pipestage (i.e. the (D) pipestage). Global decode provides information which permits the initiation of both instruction scheduling and lower levels of instruction decode. The performance of complex instruction scheduling functions can therefore proceed in parallel with the configuration of the required execution units; by the end of the (D) pipestage, the instructions are scheduled to launch into the (E) stage (when appropriate), and the appropriate functional units are configured to process them.

As previously discussed, Global Decoder 82 performs special hardwired execution functions in addition to its instruction group classification functions. These execution functions eliminate hazards that would otherwise prohibit some commonly-occurring packet combinations from issuing in parallel, thereby significantly improving CPU throughout performance. There are two such hardwired features: Fast Constant and Fast Index.

Figure 27:
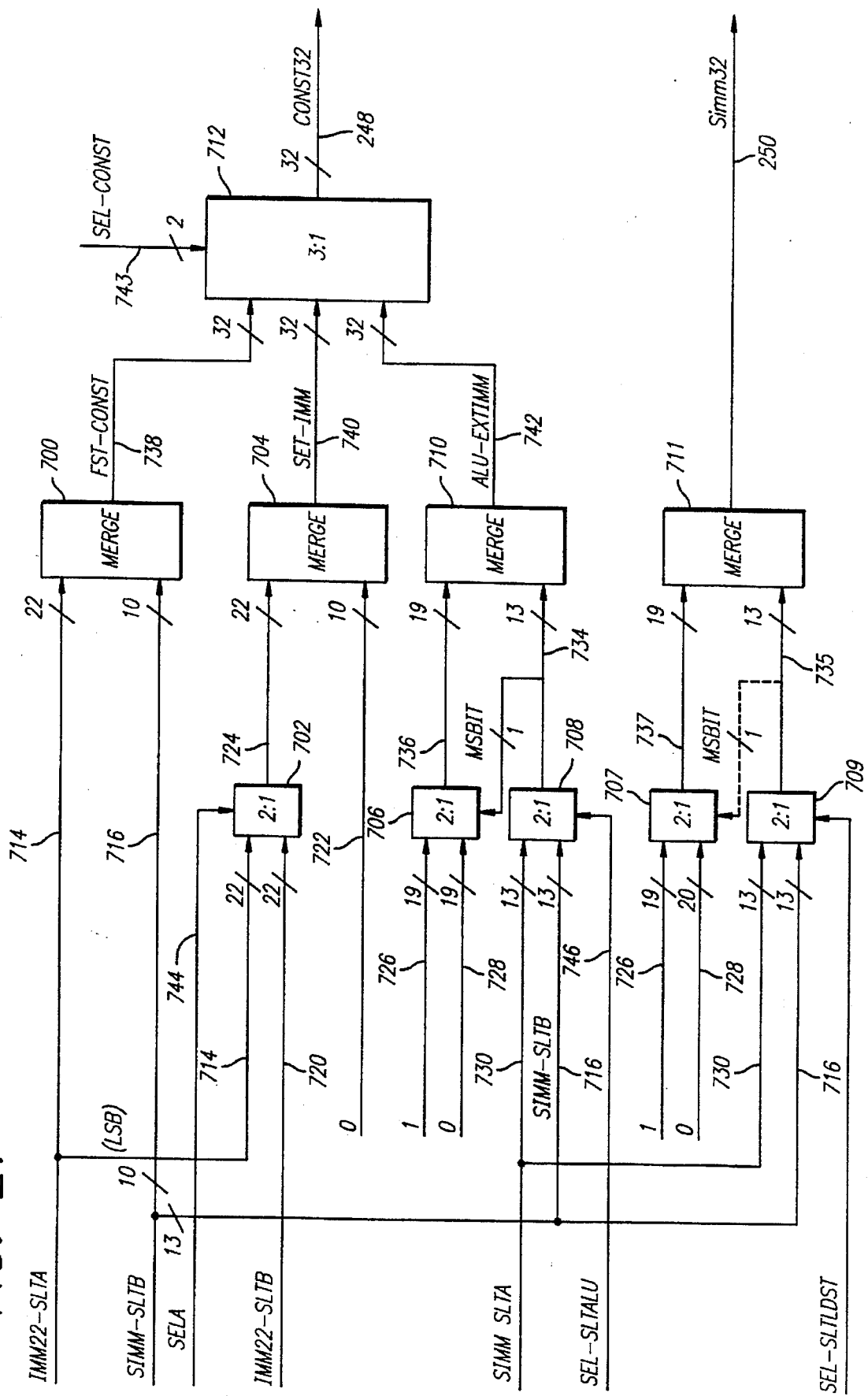
FIG. 27 is a block-level diagram of the Constant Generator Circuit of the Global Decoder of the preferred embodiment.

Both the Fast Constant and Fast Index features are performed by the Global Decoder Constant Generator Circuit illustrated in FIG. 27. Three types of constants are typically used in the SPARC Instruction Format. The simplest constant is one used for both integer alu instructions and load/store instructions, where the second operand specified in the instruction is a thirteen-bit immediate value rather than a register. The immediate value is specified for these instructions in bits zero through twelve of the instruction word. For either ALU 22 or LDST 24 to use the value, it must be converted to a thirty-two bit sign-extended constant. Referring to FIG. 27, the logical paths which generate alu-extimm 742 and Simm32 250 perform this conversion for the ALU 22 and LDST 24 respectively. Bit fields simm-SLTA 730 and simm-SLTB 716 emanate from bits zero through twelve of SLOTA and SLOTB of DBUF 68 respectively.

Assume that a load instruction is currently in SLOTA and an add instruction is in SLOTB, both of which specify a signed-immediate value for their second operands. Global Decoder 82 will cause SEL-SLTALU 746 to select the binary value on Simm-SLTB 716 to pass through two-to-one multiplexer 708 to output 734. Global Decoder 82 will also cause SEL-SLTLDST 747 to select the binary values on Simm-SLTA 730 to pass through two-to-one multiplexer 709 to output 735. If the binary value of the most significant bit (i.e. bit twelve) of multiplexer outputs 734 and 735 are a one, two-to-one multiplexers 706 and 707 will pass binary ones to nineteen bit outputs 736 and 737. If the most significant bit of thirteen bit outputs 734 and 735 are binary zeros, nineteen bit outputs 736 and 737 will be all zeros accordingly. Merge blocks 710 and 711 merge thirteen bit inputs 734 and 735 with nineteen bit inputs 736 and 737 respectively, and resulting thirty-two bit outputs alu-extimm 742 and Simm32 250 are sign extended versions of the thirteen bit values specified in the instructions.

Global Docoder 82 will then impose the appropriate binary value on sel-const 743, causing three-to-one multiplexer 712 to pass alu-extimm 742 to output Const32 248. Referring to FIG. 19, Const32 248 is input to MuxD 18(D) and is therefore available as an operand source for the second input (OpD 274) of ALU 22. Simm32 250 is input to MuxB 20(B) and is therefore available as an operand source for the second input (OpB 258) of LDST 24.

A second type of constant is created using the SPARC sethi instruction. The sethi instruction takes a twenty-two bit immediate value, specified in bits zero through twenty-one of the instruction word, and shifts it to the twenty-two most significant bits of a thirty-two bit constant (the ten least significant bits are cleared). The logic path which generates set-imm 740 in FIG. 27 performs this function. Bit fields imm22-SLTA 714 and imm22-SLTB 716 emanate from bits zero through twenty-one of SLOTA and SLOTB of DBUF 68 respectively. Depending upon whether a sethi instruction is in SLOTA or SLOTB (if there is one in both, the SLOTA instruction always gets processed first), SELA 744 selects the appropriate twenty-two bit field to pass through two to one multiplexer 702 to twenty-two bit output 724. Merge block 704 then appends ten binary zeros to the least significant end of the twenty-two bit immediate value, creating a sethi constant without involving the ALU 22 for shifting purposes. Global Decoder 82 then imposes the appropriate binary value on sel-const 743, causing set-imm 740 to pass through multiplexer 712 to Const32 248 and ultimately to multiplexer MuxD (18(D), FIG. 19). Because the ALU 22 does not actually shift any bits (the Global Decoder 82 has essentially executed the instruction already in (D)), it simply passes the value on Const32 248 straight through to its output during the (E) stage. The value is ultimately stored in the destination register specified in the sethi instruction at the end of the (W) pipestage.

The third type of constant is a thirty-two bit constant constructed by two instructions. FIG. 28 shows the two combinations of instructions typically employed to construct complete thirty-two bit constants. The first instruction is the same for both combinations, a sethi instruction. The second instruction then either adds or logically ors, with the sethi constant, a thirteen bit signed-immediate value. Without special treatment, neither of these packet combinations could launch simultaneously; they both belong to the same instruction class (i.e. Group B) because they require the same execution resource (i.e. ALU 22, FIG. 19). Further, a data dependency exists between the destination register of the SLOTA instruction and the first source register of the SLOTB instruction; they are both $r_x$.

The topological path of the Constant Generator Circuit in FIG. 27 eliminates the need for a packet split by making it unnecessary for the ALU 22 to execute either instruction. The circuit simply merges the twenty-two bit immediate value specified by the sethi instruction in SLOTA, appearing on imm22-SLTA 714, with the ten least significant bits of the thirteen bit immediate value specified in the add or or instruction in SLOTB (i.e. on simm-SLTB 716). Global Decoder 82 then imposes an appropriate value on sel-const 743, which causes Fst-Const 738 to pass through multiplexer 712 to output Const32 248, and then ultimately to multiplexer MuxD (18(D), FIG. 19). Because ALU 22 does not actually execute either of the instructions in the packet (Global Decoder 82 has essentially executed them both during (D)), the ALU 22 simply passes the value through to its output (by logically Oring the value with zero) during the (E) pipestage. The value is ultimately stored in register $r_y$ at the end of the (W) pipestage.

The Global Decoder will not perform the Fast Constant feature described above if the immediate value specified in the and or or instruction does not have zeros for its three most significant bits (i.e. the thirteen bit immediate value must be less than four hundred hexidecimal).

The Fast Index feature is performed on pairs of instructions often used by programmers to quickly establish base addresses for array indexing. The typical sequential pairs of instructions used for this purpose are listed in FIG. 29. There appears to be a data dependency between these instructions which would prevent them from issuing simultaneously. The SLOTB instruction uses the destination register of the SLOTA instruction as one of its source operands. The Global Decoder 82 uses the Constant Generator circuitry of FIG. 29 to eliminate this hazard during the (D) pipestage, thereby permitting the launch of these commonly used instruction pairs simultaneously.

The Constant Generator circuit of FIG. 27, as previously described above, executes the sethi instruction through its middle logical path by generating set-imm 740. Thus, the resulting thirty-two bit constant is available before the (D) pipestage is complete. If one of the packet combinations illustrated in FIG. 29 is currently in DBUF 68, Global Decoder 82 will execute the sethi instruction using its Constant Generator circuit (FIG. 27) during the (D) pipestage as described above. The value of the sethi constant (i.e. set-imm 740) will then be passed through multiplexer 712 to output Const32 248. Referring to FIG. 19, Const32 248 is provided to multiplexers MuxD 18(D) and MuxA 20(A). Thus, the results of the sethi instruction is made available to the second operand input of ALU 22 (i.e. OpD 274) and the first operand input of LDST 24 (i.e. OpA 260) prior to the end of the decode (D) pipestage. The Global Decoder 82 has thereby eliminated the necessity for the SLOTB instruction to wait one clock cycle while the ALU 22 generates the constant during its (E) pipestage. On the next rising edge of the CPU clock, ALU 22 simply passes the previously generated result through to its output 266, while LDST 24 uses the result to execute the SLOTB instruction. The sethi constant is eventually written into $r_x$ at the end of the (W) pipestage. As it passes through ALU 22, the sethi constant is also added to the second operand of the SLOTB instruction to calculate the effective address of the index.

If the SLOTB instruction of a Fast Index combination specifies a thirteen bit signed-immediate value for its second source operand, the Constant Generator Circuit also generates the appropriate thirty-two bit sign-extended constant, using its logical path at the bottom of the diagram to generate Simm32 250. Simm32 250 is input to multiplexer MuxB (20(B), FIG. 19), making the constant value available to the second operand input of LDST (24, FIG. 19). If a register is specified as the source for the SLOTB instruction's second operand, however, multiplexer MuxB 20(B) simply passes the value obtained from the register file on thirty-two bit input 232 to OpB 258 instead. In any case, the Global Decoder 82 has eliminated the data dependency between the SLOTA and SLOTB instructions by executing the SLOTA sethi instruction during (D) (instead of ALU 22 during (E)), and providing that result directly to the first operand input of LDST 24 before the end of (D); the two instructions are essentially issued concurrently.

b. Intrapacket Scheduling Logic

As previously described, the purpose of the Intrapacket Scheduling Logic (76, FIG. 24) is to scrutinize the two instructions comprising each packet for intrapacket data dependencies (i.e. data dependencies between instructions in the same packet) which must preclude their simultaneous launch and execution. If such a dependency is detected within the packet most recently fetched and stored in DBUF (68, FIG. 24), the Intrapacket Scheduling Logic (76, FIG. 24) issues an active true signal on output PktSplt 77. This causes Instruction Issue Logic (80, FIG. 24) to tentatively schedule the SLOTA instruction for launch on the rising edge of the next clock cycle, while scheduling the SLOTB instruction for launch one full clock cycle after the SLOTA instruction launches.

Dependencies may also exist between the source registers specified in the instruction(s) comprising the packet currently awaiting launch scheduling in DBUF (68, FIG. 24) and any of the instructions currently executing in either the ALU or LDST pipelines. These dependencies, called interpacket data dependencies (i.e. between instructions of different packets), may cause further delays in launching the instruction(s) currently in DBUF (68, FIG. 24). These delays will always be relative to any split-packet delays created by the Intrapacket Scheduling Logic (76, FIG. 24). Interpacket data dependencies are the concern of the Interpacket Scheduling Logic (78, FIG. 24), which will be described in more detail later.

There are four general cases of data dependencies between the instructions comprising a packet which must result in a packet split. These dependencies arise out of the use of a register common to both instructions as either the source or destination of an operand. The ALU (22, FIG. 19) and LDST (24, FIG. 19) both use registers residing in IREG (16, FIG. 1) as sources and destinations for their operands. The FPDP (3, FIG. 18) and its execution resources (i.e., FAU 34 and FMU 37 in FIG. 18) use registers residing in FREGS (26, FIG. 18) as sources and destinations for their operands. The LDST unit (24, FIG. 18), although resident in CDP (1, FIG. 18), performs memory loads to, and memory stores from, both floating-point registers and integer registers. The LDST unit (24, FIG. 19) always uses integer registers as the source of its operands to calculate an effective address, but may use either integer or floating-point registers as the destination for its result operands. There can never be a dependency between an integer and a floating-point register because they physically reside in separate register files. It should be pointed out that future embodiments will include the means to move operands directly between the two register files. This additional functionality will then create the possibility for dependencies between integer and floating-point registers; the present embodiment can easily be extended to detect this additional case.

A Case I dependency is characterized by the use of the same register as both the destination register of the SLOTA instruction (rd1A), and as a source register for the SLOTB instruction (rs1B or rs2B). Referring to FIG. 30, four examples of instruction packets involving a Case I data dependency are shown. Packets one and two illustrate this type of dependency between two integer registers; Packets three and four illustrate a Case I dependency between two floating-point registers. Packet one contains an integer add instruction in SLOTA and an integer register load single word instruction in SLOTB. Note that integer register $r_2$ is specified as the first source register (rs1B) of the SLOTB instruction and as the destination register (rd1A) of the SLOTA instruction.

A computer program is written to execute sequentially (i.e. "in-order"). Thus the operand stored in register $r_2$, which is required for execution of the SLOTB load instruction, is intended by the programmer to be the value which results from the add operation performed by the SLOTA instruction. If these two instructions are permitted to execute simultaneously, the SLOTB instruction will access IREGS (16, FIG. 19) for the operand stored in register $r_2$ (i.e. during the (D) stage of its pipeline) before the add operation has been able to generate its result (i.e. in the (E) stage of its pipeline). The result of the load operation would therefore be erroneous because it would access an incorrect value from $r_2$. This type of dependency is known as an RAW hazard.

The Intrapacket Scheduling Logic (76, FIG. 24) functions to detect this data dependency and to schedule the SLOTB instruction for launch one full clock cycle behind the SLOTA instruction. Once this splitting of a packet is effected (i.e. when the SLOTA instruction has issued singularly), the dependency becomes interpacket in nature; the two instructions have become separate packets and the dependency between them spans two packets. The Interpacket Scheduling Logic (78, FIG. 24) then takes over the scheduling of the delayed SLOTB instruction. Actually, the delayed SLOTB instruction will be advanced to SLOTA, and the instruction next in the program sequence will fill SLOTB. The former SLOTB instruction (currently in SLOTA) will be scheduled for launch by the Interpacket Scheduling Logic (78, FIG. 24) as soon as the result from the add operation most recently issued from SLOTA has been generated and is available through the operand dependency bypass or forwarding circuitry (FIG. 19). The operation and configuration of the Interpacket Scheduling Logic (78, FIG. 24) and its associated forwarding circuitry (FIG. 19) will be described in greater detail later.

Packet two of FIG. 30 illustrates a second example of a Class I dependency between integer registers. The SLOTA instruction, an integer register load double word, accesses a double-word operand stored in memory at the address which is the sum of the values in $r_0$ and $r_1$. The double word operand is sixty-four bits and must therefore be stored in two registers; a single register can store only thirty-two bits maximum. Thus, although the instruction explicitly expresses only one destination register (rd1A), another is implicitly specified out of necessity. The most significant word is stored in rd1A, which is $r_2$ in our example. The least significant (or lower-order) word is stored in rd1A +1, which is r(2+1), or $r_3$. The SLOTB instruction specifies the contents of $r_3$ as its second source operand (rs2B). Therefore, the SLOTB instruction cannot be permitted to execute simultaneously with the SLOTA instruction; the Intrapacket Scheduling Logic (76, FIG. 24) must delay the execution of the SLOTB instruction by one clock cycle from the launch of the SLOTA instruction (i.e. split the packet).

Packets three and four of FIG. 30 illustrate the occurrence of a Case I dependency between two floating-point registers. Packet four is analogous to Packet two: the dependency exists because the same floating-point register ($f_1$) is specified as both the implicit (low-order word) destination register (rd1A+1) for the floating-point register load double word instruction in SLOTA, and the first source register (rs1B) of the floating-point single-precision multiply instruction in SLOTB. Packet three contains a double-precision floating-point add instruction in SLOTB. A double-precision floating-point operation requires double words (and therefore two registers) for all of its specified register operands. Thus, the exponent and high-order bits of the operand fraction reside in the explicit source register (rs2B), specified as register $f_2$ in SLOTB, and the low-order bits of the operand fraction reside in the implicit source register $f_3$ (i.e. fn+1). Thus, there is a Case I dependency between the destination register of the SLOTA instruction, and the implicit low-order source register of the SLOTB instruction. Extended-precision floating-point instructions require four registers for each of its specified register operands. Therefore, the specification of register $f_3$ (also $f_0$, $f_1$ and $f_2$) as the destination of the SLOTA instruction in Packet three would create a dependency with the source register specification of register $f_0$ if an extended-precision floating-point operation were specified in SLOTB.

It should be noted that the Intrapacket Scheduling Logic (76, FIG. 24) is not concerned with detecting dependencies between instructions which fall into the same group classification. As discussed previously, instructions from the same group require the same computational resource. Any packet containing instructions from the same group (except a Fast Constant) will be split by the Instruction Issue Logic (80, FIG. 24) as a function of the global decode performed by Global Decoder (82, FIG. 19). Additionally, the Intrapacket Scheduling Logic (76, FIG. 24) does not have to detect dependencies between registers specified by Group F instructions; the Instruction Issue Logic (80, FIG. 24) splits any packets which contain Group F instructions as a function of the instruction decode process. Further, Case I dependencies will not occur with either an integer or floating-point register store single word or store double word in SLOTA because store instructions do not have a true destination register. Finally, Case I dependencies cannot occur between a floating-point operation in SLOTA and either an integer or floating-point register load word or load double word in SLOTB; the source operands for a load word and load double word are always integer. The destination registers for all floating- point operations that generate a result operand must be floating-point.

A Case II data dependency is characterized by a floating-point operation in SLOTA that generates a result and writes that result to a destination register, and a floating-point register store single word or store double word in SLOTB that stores the result generated by the SLOTA instruction to external memory. A store instruction does not have a true destination operand, but rather three source operands. The SPARC instruction format, however, constrains an instruction to two source operand fields and one destination operand field. Thus, one of the store instruction's source operands must be specified in a destination operand field. A Case II dependency is quite analogous to a Case I dependency: both cases involve the SLOTB instruction's dependency on the SLOTA instruction to generate as its result, one of the SLOTB instruction's source operands (an RAW hazard). In Case II, however, the dependent source operand in SLOTB must be specified as a destination. Therefore, the Intrapacket Scheduling Logic (76, FIG. 2) must detect this dependency as if between two destination registers.

Referring to FIG. 30, Packets five and six provide examples of Case II dependencies. In Packet five, the floating-point add operation in SLOTA generates its result and stores it in floating-point register $f_0$. The floating-point register store single word in SLOTB takes the operand resulting from the SLOTA instruction, now stored in $f_0$, and stores it in external memory at a location, the effective address of which is generated by the sum of the values stored in integer registers $r_2$ and $r_3$. If these two instructions are launched simultaneously, the store instruction in SLOTB will access register $f_0$ before the floating-point operation can calculate the operand that the programmer expects to be in $f_0$ when the SLOTB instruction executes. This is mainly attributable to the fact that the FPDP (3, FIG. 18) operates asynchronously to the CDP (1, FIG. 18).

If these two instructions are permitted to launch concurrently, the floating-point operation in SLOTA will be transferred to the FPQ (38, FIG. 18), where the FPSCHED (36, FIG. 18) takes control over the floating-point instruction's scheduling and execution. Meanwhile, the store instruction (although floating-point in nature) is executed under control of CSCHED (2, FIG. 18). The store instruction, once launched, cannot be aborted.

There are many reasons why the floating-point operation might be delayed (e.g., there are other floating-point instructions stacked ahead of it in the FPQ (38, FIG. 18). If the store instruction is launched before these conditions are ascertained, the instructions will be executed out-of-order; the store instruction will execute before the add instruction. Therefore, the Intrapacket Scheduling Logic 76 must detect this condition and schedule the SLOTB store instruction one clock cycle after the floating-point instruction is transferred to the FPDP (3, FIG. 18). This one clock cycle delay will permit FPSCHED (36, FIG. 18) to ascertain the dependency between the floating-point instruction and the store instruction. FPSCHED will then notify the Instruction Issue Logic (80, FIG. 24) to hold the store instruction until the floating-point result is available; the store instruction will then be permitted to launch and execute.

It should be noted that the Intrapacket Scheduling Logic (76, FIG. 24) does not have to schedule a delay between instructions having this type of dependency if they are both integer in nature. An integer ALU operation, launched simultaneously with an integer register store word or store double word instruction, will execute synchronously with one another; they are always in the (E) pipestage at the same time. A store instruction cannot access its third source operand (specified as a destination) until the second stage of its pipeline (the execution stage); there are only two IREGS (16, FIG. 19) read ports available to the LDST Unit (24, FIG. 19). Because the integer ALU operation always generates its result during an instruction's (E) pipestage, the operand upon which the store instruction depends can be forwarded by the Interpacket Scheduling Logic (78, FIG. 24) from the output of the ALU to the input of the LDST Unit (24, FIG. 19) while they are both in their (E) pipestages. The need for a delay (i.e. split packet) to be introduced by the Intrapacket Scheduling Logic (76, FIG. 19) is eliminated because the SLOTB store instruction's access to its third operand is inherently delayed one clock cycle. Operation of the Interpacket Scheduling Logic (78, FIG. 24) and its associated pipeline forwarding logic will be discussed in detail later. It should be pointed out that two additional ports could be added to IREGS (16, FIG. 19), dedicated to provide operand access to MuxStA (21, FIG. 19) and MuxStB (22, FIG. 19), which would eliminate this operand access during the (E) pipestage for a store instruction. The preferred embodiment does not implement these additional ports, however, as a performance trade-off against higher die costs.

A Case III dependency arises when both instructions in a packet write their results to the same destination register. This type of dependency is known as a WAW hazard. If both instructions are permitted to execute simultaneously, there is a risk that the SLOTB instruction could execute faster and update the destination register first, only to be overwritten by the later completion of the SLOTA instruction. Thus, "in-order" execution of the program would be compromised. Packets seven and eight in FIG. 30 provide examples of Case III dependencies. In Packet seven, the integer register load double word instruction in SLOTA requires an implicit destination register $r_3$; the same register is used as the destination for the integer add instruction in SLOTB. Similarly, the double-precision floating-point add instruction in SLOTA of Packet eight requires an implicit destination register $f_3$, which is the same destination register used by the floating-point register load word instruction in SLOTB. The Intrapacket Scheduling Logic (76, FIG. 24) must detect this condition and schedule the SLOTB instruction to launch one clock cycle after the SLOTA instruction. This packet split preserves in-order program execution.

The Case IV dependency is also a potential compromise of in-order program execution. This type of dependency is known as a WAR hazard. The Case IV dependency is characterized by a packet comprised of a floating-point operation in SLOTA and a floating-point register load single word or load double word in SLOTB. The conflict arises where a floating-point register specified as one of the source operands in the SLOTA floating-point operation is also specified as the destination register of the floating-point load single word or load double word in SLOTB.

Packet Nine of FIG. 30 provides an example of a Case IV dependency. Note that none of the other dependency types are present. If the instructions in this packet were permitted to launch simultaneously, the SLOTA floating-point operation would be transferred to the Floating-point Queue (38, FIG. 18) where it would be executed when feasible under control of the Floating-point Scheduler (36, FIG. 18). Meanwhile, the floating-point register load double word in SLOTB will begin execution immediately under control of the CSCHED (2, FIG. 24); CDP (1, FIG. 18) executes instructions asynchronously with FPDP (3, FIG. 18).

A number of conditions might exist which would delay the execution of the floating-point instruction, such as the presence of other instructions ahead of it in the FPQ (38, FIG. 18), or because it requires the result of a floating-point instruction not yet executed as one of its source operands (i.e. an interpacket data dependency). Thus, the floating-point instruction might not begin execution (and therefore access its source operands) until after the CDP (1, FIG. 18) has completed execution of the floating-point register load word instruction. If such a packet is permitted to launch intact, the floating-point source register specified in the SLOTA floating-point instruction (e.g. floating-point register $f_0$, in Packet nine) could be overwritten by the SLOTB floating-point register load single word or load double word before the floating-point operation in SLOTA can access the floating-point source register and obtain the intended operand value.

To insure in-order program execution, the Intrapacket Scheduling Logic detects this dependency and schedules the SLOTB instruction for launch one clock cycle after the SLOTA instruction (i.e. splits the packet). The one clock cycle delay provides FPSCHED (36, FIG. 18) the time to ascertain any delays in executing the SLOTA floating-point operation, and to notify Instruction Issue Logic (80, FIG. 24) to hold the SLOTB instruction until the floating-point instruction has completed. Again, this issue never arises between an integer ALU operation and an integer register load single word or load double word instruction because both instructions are executed synchronously within the CDP (1, FIG. 18); the ALU will always access its integer source operands while both instructions are in their decode stages. The integer register load word instruction will not update IREGS (16, FIG. 19) until both instructions are in their update stages four clock cycles later.

Figure 31A:
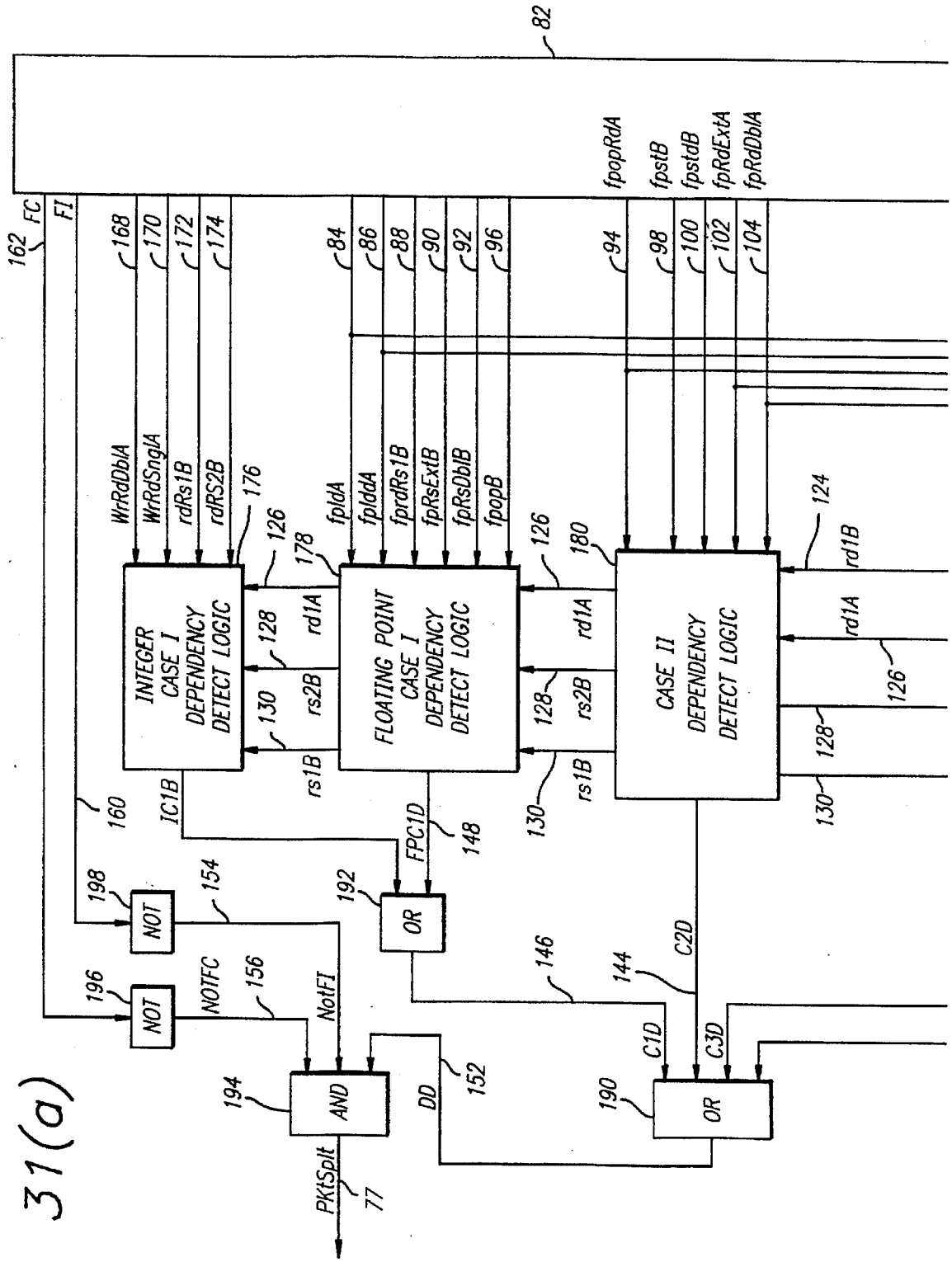
FIG. 31a is the top portion of, and FIG. 31b is the bottom portion of, a block-level diagram of the Intrapacket Scheduling Logic of the preferred embodiment.
Figure 31B:
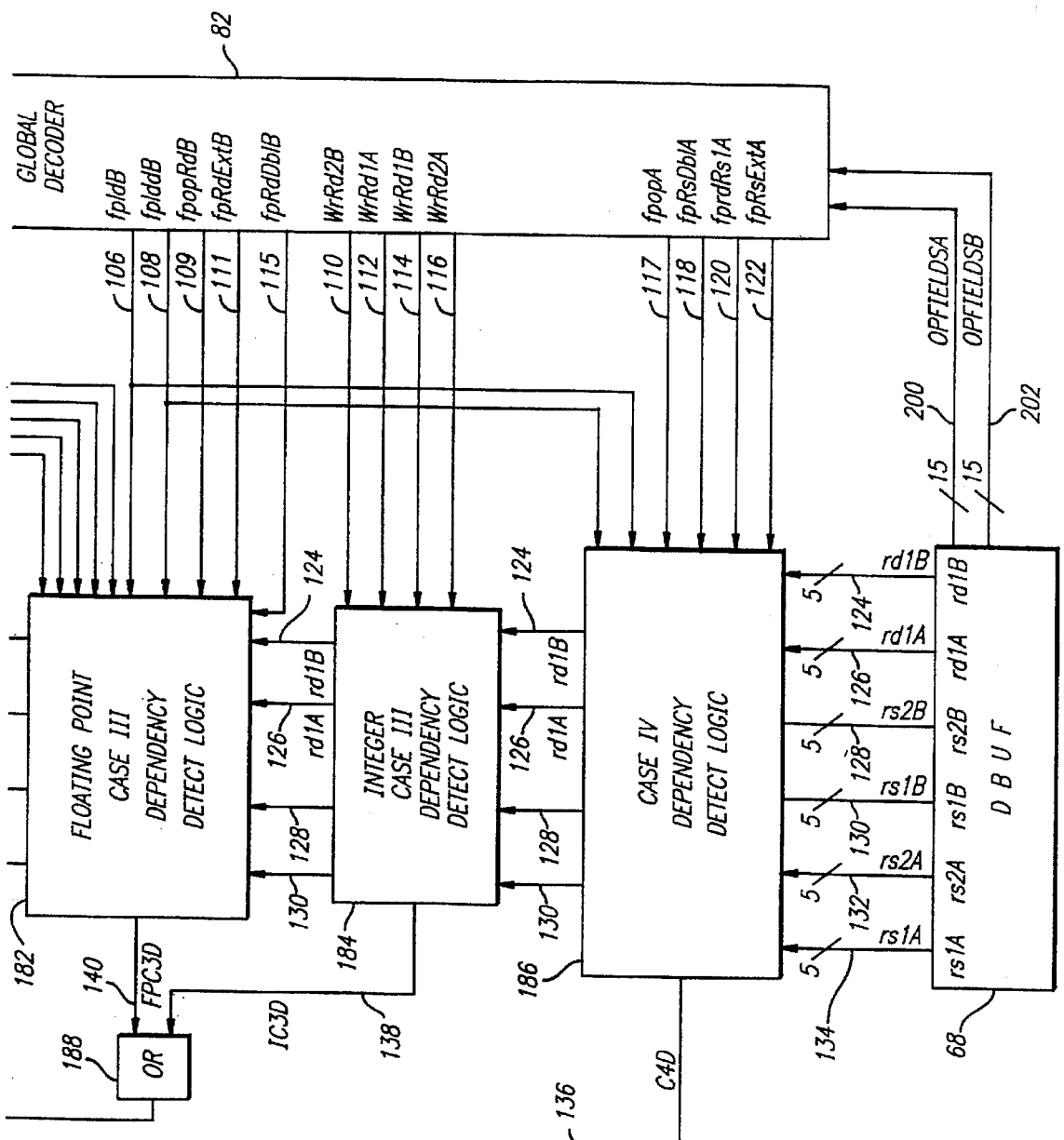

Referring to FIGS. 31a and 31b, a more detailed description of the preferred embodiment of the Intrapacket Scheduling Logic (76, FIG. 24) is presented. The Intrapacket Scheduling Logic is comprised of Detect Logic blocks 176, 178, 180, 182, 184 and 186; OR blocks 188, 190 and 192; AND block 194 and NOT blocks 196 and 198. The Detect Logic blocks receive six, five-bit address fields: rs1A 134, rs2A 132, rs1b 130, rs2B 128, rd1A 126 and rd1B 124 directly from DBUF 68. DBUF 68 is a mechanism which contains the packet of program instructions currently awaiting decode and launch scheduling. Five-bit fields rs1A 134 and rs1B 130 emanate from bits fourteen through eighteen of the SLOTA and SLOTB instructions respectively, each of which specifies one of thirty-two, thirty-two bit registers to be used to supply the first source operand for the two instructions. Five-bit fields rs2A 132 and rs2B 128 emanate from bits zero through five of the SLOTA and SLOTB instructions respectively, each of which specifies the one of thirty-two registers to be used to supply the second source operand for the two instructions. Five-bit fields rd1A 126 and rd1B 124 emanate from bits twenty-five through twenty-nine of the SLOTA and SLOTB instructions respectively, each specifying the one of thirty-two registers to be used to supply the destination for the results generated by the instructions. If either one of the packet instructions does not use a register as a source or destination for any of its three operands, the corresponding bit fields are ignored for purposes of detecting register dependencies.

Integer Case I Dependency Detect Logic 176 detects Case I dependencies between integer registers. Output IC1D 150 becomes active true when such a dependency has been detected to exist between the SLOTA and SLOTB instructions currently awaiting launch scheduling in DBUF 68. Input wrRdDb1A 168 becomes active true if the instruction currently in SLOTA is an integer register load double word. Input wrRdSng1A 170 is active true if the instruction currently in SLOTA is either an integer ALU or an integer register load single word instruction. Input rdRs1B 172 is active true if the instruction currently in SLOTB is any ALU instruction except a sethi, or either an integer register or floating-point register load single word, load double word, store single word or store double word. Input rdRs2B 174 is active true under the same circumstances as rdRs1B 172, except the instruction in SLOTB must be of the register-register variety that uses a register for its second source operand (as opposed to a thirteen bit immediate value). Input field rs1B 130 provides Detect Logic 176 with the five-bit address which specified the register used by the instruction currently in SLOTB as the source of its first operand. Input field rs2B 128 provides Detect Logic 176 with the five-bit address which specifies the register used by the instruction currently in SLOTB as the source of its second operand. Input field rd1A 126 provides Detect Logic 176 with the five-bit address which specifies the register used by the instruction currently in SLOTA as the destination for the result of its performed operation.

Output IC1D 150 will become active true (indicating the existence of a dependency) if either:

(1) rdRs1B 172 is true and the binary values of the four most significant bits (MSB's) of both rs1B 130 and rd1A 126 match, and
  (a) wrRdDb1A 168 is true, or
  (b) wrRdSng1A 170 is true and the binary value of the least significant bit (LSB) of both rs1B 130 and rd1A 126 matches; or (2) rdRs2B 174 is true and the binary values of the four MSB's of both rs2B 128 and rd1A 126 match, and
  (a) wrRdDb1A 168 is true, or
  (b) wrRdSng1A 170 is true and the binary value of the LSB of both rs2B 128 and rd1A 126 matches.

Floating Point Case I Dependency Detect Logic 178 detects Case I data dependencies between floating-point registers. Output FPC1D 148 becomes active true when such a dependency exists between the two instructions currently awaiting launch scheduling in DBUF 68. Input fpldA 84 is active true when the instruction currently in SLOTA is a floating-point register load single word. Input fplddA 86 is active true when the instruction currently in SLOTA is a floating-point register load double word. Input fprdRs1B 88 is active true if the instruction currently in SLOTB is a floating-point operation (fpop) which accesses a register (the address for which is specified in field rs1B 128) for its first source operand. Input fpRsDb1B 92 is active true when the instruction currently in SLOTB is a double-precision fpop which requires two registers for each register source operand. Input fpRsExtB 90 is active true when the instruction currently in SLOTB is an extended-precision fpop which requires four registers for each register source operand.

Input fields rs1B 130 and rs2B 128 provide the Detect Logic 178 with the five-bit addresses which specify the registers to be used as sources by the instruction currently in SLOTB. Input field rd1A 126 provides Detect Logic 178 with the five-bit address specified in the instruction currently in SLOTA as its destination register.

Output FPC1D 148 will be active true (indicating the existence of a dependency) if:

(1) fprdRs1B 88 is true, the binary values of the three MSB's of both rs1B 130 and rd1A 126 match, and fpldA 84 or fplddA 86 is true, and
  (a) fpRsExtB is true, or
  (b) fpRsDb1B 92 or fplddA 86 is true and the binary value of the second to the LSB (Bit 2) of both rs1B 130 and rd1A 126 matches, or
  (c) fpldA 84 is true and the binary values of the two LSB's of rd1B 130 and rd1A 126 match; or (2) fpopB 96 and fpldA 84 or fplddA 86 is true and the binary values of the three MSB's of both rs2B 128 and rd1A 126 match, and
  (a) fpRsExtB is true, or
  (b) fpRsDb1B 92 or fplddA 86 is true and the binary value of the second to the LSB (Bit 1) of both rs2B 128 and rd1A matches, or (c) fpldA 84 is true and the binary values of the two LSB's of both rs2B 128 and rd1A 126 match.

Case II Dependent Detect Logic 180 detects Case II data dependencies. Output C2D 144 becomes active true when such a dependency exists between the two instructions currently awaiting launch scheduling in DBUF68. Input fpopRdA 94 is true when the instruction currently in SLOTA is a floating-point operation which generates a result to be stored in a destination register. Input fpStB 98 is active true if the instruction currently in SLOTB is a floating-point register store single word. Input fpStdB 100 is active true if the instruction currently in SLOTB is a floating-point register store double word. Input fpRdDb1A 104 is active true if the instruction currently in SLOTA is a double-precision fpop. Input fpRdExtA 102 is active true if the instruction currently in SLOTA is an extended-precision fpop. Input fields rd1A 126 and rd1B 124 provide Detect Logic 180 with the five-bit addresses which specify the registers to be used by the instructions currently in SLOTA and SLOTB respectively as the destinations for their results.

Output C2D 144 becomes active true (indicating the existence of a dependency) if:

fpopRdA 94 is true, the binary values of the three MSB's of both rd1A 126 and rd1B 124 match and fpStB 98 or fpStdB 100 is true, and
(1) fpRdExtA 102 is true, or.
(2) fpStdB 100 or fpRdDb1A 104 is true and the binary value of the second to the LSB (Bit 1) of both rd1A 126 and rd1B 124 match, or
(3) fpStB 98 is true and the binary values of the two LSB's of both rd1A 126 and rd1B 124 match.

Floating Point Case III Dependency Detect Logic 182 detects Case III data dependencies between floating-point registers. Output FPC3D 140 becomes active true when such a dependency exists between the two instructions currently awaiting launch scheduling in DBUF 68. Inputs fpldA 84 and fplddA 86 become active true under the same circumstances as those described in the discussion of the Floating Point Case I Dependency Logic 178 above. Inputs fpRdDb1A 104, fpRdExtA 102 and fpopRdA 94 become active true under the same circumstances as those described in the discussion of the Case II Dependency Detect Logic 180. Input fpldB 106 is active true when the instruction currently in SLOTB is a floating-point register load single word. Input fplddB 108 is active true if the instructions currently in SLOTB is a floating-point register load double word. Input fpopRdB 109 is active true when the instruction currently in SLOTB is a floating-point operation that generates a result which is written to a destination register. Input fpRdDb1B 115 is active true if the instruction currently is SLOTB is a double-precision fpop. Input fpRdExtB 111 is active true if the instruction currently in SLOTB is an extended-precision fpop. Input fields rd1A 126 and rd1B 124 provide the five bit addresses to Detect Logic 182 which specify the destination registers used by the SLOTA and SLOTB instructions (respectively) currently awaiting launch scheduling in DBUF 68.

Output FPC3D 140 is active true (indicating the existence of a data dependency) if:

(1) fpopRdA 94 is true, the binary values of the three MSB's of both rd1A 126 and rd1B 124 match, and fpldB 106 or fplddB 108 is true, and
(a) fpRdExtA 102 is true, or
(b) fplddB 108 or fpRdDb1A 104 is true and the binary value of the second to the LSB (Bit 1) of both rd1A 126 and rd1B 124 matches, or
(c) fpldB 106 is true and the binary values of the two LSB's of rd1A 126 and rd1B 124 match; or (2) fpopRdB 109 is true, the binary values of the three MSB's of both rd1A 126 and rd1B 124 match, and either fpldA 84 or fplddA 86 are true, and
(a) fpRdExtB 111 is true, or
(b) fplddA 86 or fpRsDb1B 115 is true and the binary value of the second to the LSB (Bit 1) of both rd1A 126 and rd1B 124 matches, or
(c) fpldA 84 is true and the binary values of the two LSB's of both rd1A 126 and rd1B 124 match.

Integer Case III Dependency Logic 184 detects Case III dependencies between integer registers. Output IC3D 138 becomes active true when such a dependency exists between the two instructions currently awaiting launch scheduling in DBUF68. Input wrRd1B 114 becomes active true when the instruction currently in SLOTB is an integer ALU operation or an integer register load single word. Input wrRd2B 110 becomes active true when the instruction currently in SLOTB is an integer register load double word. Input wrRd1A 112 is active true when the instruction currently in SLOTA is either an interger ALU operation or an integer register load single word. Input wrRd2A 116 is active true when the instruction currently in SLOTA is an integer register load double word. Bit fields rd1A 126 and rd1B 124 provide the Detect Logic 184 with the five bit addresses which specify the explicit destination registers used by the SLOTA and SLOTB instructions (respectively) currently awaiting launch scheduling in DBUF 68.

Output IC3D 138 is active true (indicating the existence of a dependency) when: the binary values of the four MSB's of both rd1A 126 and rd1B 124 match, and
(1) wrRd2A 116 and wrRd1B 114 are both true, or
(2) wrRd1A 112 and wrRd2B 110 are both true, or
(3) wrRd1A 112 and wrRd1B 114 are both true and the binary value of the LSB (Bit 0) of both rd1A 126 and rd1B 124 match.

Case IV Dependency Detect Logic 186 detects Case IV dependencies. Output C4D 136 becomes active true when such a dependency exists between the two instructions currently awaiting launch scheduling in DBUF 68. Inputs fpldB 106 and fplddB 108 become active true under the same conditions as described for the Floating Point Case III Dependency Detect Logic 182. Input fpopA 117 becomes active true when the instruction currently in SLOTA is a floating-point operation. Input fpRsDb1A 118 is active true when the instruction currently in SLOTA is a double-precision fpop requiring two registers for each register source operand specified. Input fpRdRs1A 120 is active true when the instruction currently in SLOTA specifies a register as the source of its first operand. Input fpRsExtA 122 is active true when the instruction currently in SLOTA is an extended-precision fpop requiring four registers for each register source operand specified.

Output C4D 136 becomes active true (indicating the existence of a dependency) if:

fpopA 117 is true and fpldB 106 or fplddB 108 is true, and
(1) fprdRs1A 120 is true and the binary values of the three MSB's of both rd1B 124 and rs1A 134 match, and
(a) fpRsExtA 122 is true, or
(b) fpRsDb1A 118 or fplddB 108 is true and the binary value of the second to the LSB (Bit 1) of both rd1B 124 and rs1A 134 matches, or
(c) fpldB 106 is true and the binary values of the two LSB's of both rd1B 124 and rs2A 134 match; or
(2) the binary values of the three MSB's of both rd1B 124 and rs2A 132 match, and
(a) fpRsExtA 122 is true, or (b) fpRsDb1A 118 or fplddB 108 is true and the binary value of the second to the LSB (Bit 1) of both rd1B 124 and rs2A 132 matches, or (c) fpldB 106 is true and the binary value of the two LSB's of both rd1B 124 and rs2A 132 match.

Signals IC1D 150 and FPC1D 148 are inputs to OR block 192. If either an integer or floating-point Case I dependency is detected between the instructions currently in DBUF 68 (i.e., either IC1D 150 or FPC1D 148 becomes active true), output C1D 146 will become active true. Signals FPC3D 140 and IC3D 138 are inputs to OR block 188. If either an integer or floating-point Case III dependency is detected between the instructions currently in DBUF 68 (i.e., either FPC3D 140 or IC3D 138 becomes active true), output C3D 142 will become active true. Signals C1D 146, C2D 144, C3D 142 and C4D 136 are inputs to OR block 190. If any of these inputs is active true (i.e., if any one of the four cases of dependency is detected between the instructions currently in DBUF 68), output DD 152 from Or block 190 becomes active true.

There are two types of packet combinations that will ordinarily create a dependency detection (i.e. cause DD 152 to be active true), but for which the Global Decode 82 has dedicated logic to permit simultaneous execution notwithstanding the dependency. One combination of instructions is typically used by SPARC programmers to generate a thirty-two bit memory index. This special process is called Fast Index, and was discussed in the detailed description of the Global Decoder 82. As previously discussed, the Global Decoder 82 has dedicated logic which successfully executes the instructions simultaneously. If such a packet is currently in DBUF 68, however, Global Decoder 82 forces output line FI 160 active true, which is input to NOT block 198. Output NotFI 154 will become inactive false as a result.

A second combination of instructions which would normally create a dependency detection (i.e., DD 152 becomes active true), but which can be successfully processed in parallel, is used by SPARC programmers to generate thirty-two bit constants. The Fast Constant is also discussed in the detailed description of the Global Decoder 82. Such a combination creates an integer Case I dependency (i.e. IC1D 150 becomes active true). Because the Global Decoder 82 has special logic which enables it to execute these instructions simultaneously, the integer Case I dependency detection must be ignored. When a Fast Constant packet is detected, Global Decoder 82 causes output FC 162 to become active true, which is input to Not block 198. Output NotFC 156 then becomes inactive false as a result.

Signals DD 152, NotFI 154 and NotFC 156 are inputs to AND block 194. Only if all three signals are active true, is output PktSplt 77 active true. That is, only if one of the four cases of dependencies previously described is detected between the two instructions comprising the packet currently in DBUF 68, and the packet is neither a Fast Index nor Fast Constant exception, will PktSplt 77 be active true. Output PktSplt 77 is input to Instruction Issue Logic (80, FIG. 24).

If PktSplt 77 becomes active true, it instructs Instruction Issue Logic (80, FIG. 24) to tentatively schedule the SLOTA instruction for immediate launch (i.e., on the next rising edge of the clock), and to schedule the SLOTB instruction for launch one full clock cycle after the SLOTA instruction launches (i.e. split the packet). If PktSplt 77 is false, Instruction Issue Logic (80, FIG. 24) will tentatively schedule both instructions for simultaneous launch. There are circumstances where the instructions may be delayed further, but these decisions are made by scheduling logic independent of the Intrapacket Scheduling Logic (76, FIG. 24) (i.e. the Interpacket Scheduling Logic 78, FIG. 24) which will be described in detail shortly.

The invention has been described in an exemplary and preferred embodiment, but is not limited thereto. Those skilled in the art will recognize that a number of additional modifications and improvements can be made to the invention without departure from its essential spirit and scope. For example, a number of different hardware and/or software techniques or combinations thereof and any number of different software languages would be suitable for implementing the disclosed invention.

We claim:

1. A method of using a processor to execute a sequence of instructions, the processor issuing none, one or more of the instructions for execution at the start of each cycle of a clock signal, the processor comprising a plurality of execution resources associated with a plurality of pipelines, each of the instructions being classified according to which of the plurality of resources is appropriate for executing each of the instructions, each of the instructions being processed within an appropriate one of the plurality of pipelines, the appropriate one of the plurality of pipelines for each of the instructions being associated with the appropriate of the plurality of execution resources for executing each of the instructions, said method comprising the steps of:

fetching one or more of the sequence of instructions, said step of fetching further comprising the step of grouping two or more of the fetched instructions into a packet;

dynamically scheduling the instructions of the packet for execution, said step of dynamically scheduling further comprising the steps of:

globally decoding each of the instructions of the packet to produce an initial characterization of each, the initial characterization including the classification of each of the instructions of the packet;

detecting resource conflicts between or among the instructions of the packet using the initial characterization of each;

detecting intrapacket dependencies between or among the instructions of the packet using the initial characterization of each;

detecting interpacket dependencies between one or more of the instructions of the packet and one or more of the instructions of the sequence currently being processed within two or more of the plurality of pipelines ahead of the instructions of the packet; and resolving any detected resource conflicts, intrapacket dependencies and interpacket dependencies to identify which of the instructions of the packet can be executed at the start of a next cycle of the clock; and initiating execution of the identified instructions of the packet at the start of the next cycle of the clock signal;

wherein the two or more of the plurality of pipelines comprises a sequence of stages, each of the sequence of stages having a time duration equal to at least one cycle of the clock; and Wherein said step of dynamically scheduling is performed in less than one cycle of the clock, the duration of one cycle being dictated by functions of the processor other than said step of dynamically scheduling.

2. The method of claim 1 wherein said step of dynamically scheduling further comprises the step of accessing operands specified by the instructions of the packet, said step of accessing further comprising the step of obtaining the specified operands from a register file and presenting them to inputs of the appropriate execution resources.

3. The method of claim 2 wherein the detected interpacket dependencies involve specified operands which are dependent on operands generated by the execution of instructions of the sequence issued for execution at the start of previous cycles of the clock signal; and wherein said step of accessing further comprises the step of obtaining the dependent specified operands from the two or more of the plurality of pipelines, said step of obtaining the dependent specified operands further comprising the step of forwarding the generated operands from their location in the two or more pipelines to inputs of the appropriate execution resources.

4. The method of claim 3 wherein the sequence of stages of the two or more of the plurality of pipelines each comprises an instruction fetch stage, an instruction decode stage, at least one instruction execute stage, a cache stage and a write-back stage; wherein the step of dynamically scheduling is performed within the instruction decode stage; and wherein generated operands can be forwarded from the execute stage, the cache stage and the write-back stage of each of the two or more of the plurality of pipelines.

5. The method of claim 2 wherein said step of dynamically scheduling further comprises the step of locally decoding each of the instructions of the packet using the initial characterization of each to generate configuration signals with which to configure the appropriate execution resources to execute each of the instructions of the packet.

6. The method of claim 5 wherein said steps of detecting resource conflicts, detecting intrapacket dependencies, detecting interpacket dependencies, locally decoding and accessing operands are performed substantially in parallel with one another.

7. The method of claim 1 wherein the sequence of stages of the two or more of the plurality of pipelines each comprises an instruction fetch stage, an instruction decode stage and at least one instruction execute stage; and wherein the step of dynamically scheduling is performed within the instruction decode stage.

8. The method of claim 1 wherein at least one of the two or more pipelines is appropriate for processing address calculations and at least one of the two or more pipelines is for handling integer arithmetic and logical operations.

* * * * *